(12) United States Patent
Kurihara

(10) Patent No.: US 7,907,313 B2
(45) Date of Patent: Mar. 15, 2011

(54) MANAGEMENT OF MULTIPLE PRINTER DRIVERS

(75) Inventor: Shukei Kurihara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1026 days.

(21) Appl. No.: 11/687,226

(22) Filed: Mar. 16, 2007

(65) Prior Publication Data

US 2007/0216926 A1    Sep. 20, 2007

(30) Foreign Application Priority Data

Mar. 17, 2006    (JP) ................. 2006-075545

(51) Int. Cl.
*H04N 1/46* (2006.01)
*G06F 3/12* (2006.01)

(52) U.S. Cl. .................. 358/500; 358/1.15

(58) Field of Classification Search ............ 358/1.1, 358/1.9, 1.13, 1.14, 1.15, 1.18, 448, 474, 358/468, 500
See application file for complete search history.

(56) References Cited

U.S. PATENT DOCUMENTS

| | | | |
|---|---|---|---|
| 6,707,568 B1* | 3/2004 | Yu | 358/1.15 |
| 7,265,862 B2 | 9/2007 | Kurihara | |
| 7,423,769 B2* | 9/2008 | Yu | 358/1.15 |
| 2004/0141203 A1* | 7/2004 | Honma | 358/1.15 |
| 2005/0024671 A1* | 2/2005 | Abe | 358/1.13 |
| 2005/0141013 A1* | 6/2005 | Kikuchi et al. | 358/1.14 |
| 2006/0072140 A1* | 4/2006 | Mitani | 358/1.13 |
| 2007/0002349 A1* | 1/2007 | Hwang et al. | 358/1.13 |

FOREIGN PATENT DOCUMENTS

| | | |
|---|---|---|
| JP | 11-184656 | 7/1999 |
| JP | 2001-154821 | 6/2001 |
| JP | 2004021460 | 1/2004 |

OTHER PUBLICATIONS

Office Action, dated Sep. 25, 2008, in KR 10-2007-0026340.
Emerson, Daniel, "Advances in Window Printing", Microsoft Corp., http:www.microsoft..com/whdc/device/print/default.mspx (Advances in Windows© Printing: TWPR05001_WinHEC05.ppt), WinHEC Seattle, 2005.
"Longhorn To Bring New Printing Path"; Directions On Microsoft; Jun. 20, 2005.
Office Action dated Dec. 22, 2010, concerning Korean Patent Application No. 10-2007-0026340.

* cited by examiner

*Primary Examiner* — Gabriel I Garcia
(74) *Attorney, Agent, or Firm* — Fitzpatrick, Cella, Harper & Scinto

(57) ABSTRACT

It is determined whether a combination of an output requesting application and a printer driver designated as an output destination is a combination of the first application and first printer driver or a combination of the second application and second printer driver. When it is determined that the combination of the output requesting application and the printer driver is neither of these combinations, confirmation information to confirm whether to execute a print process is output.

27 Claims, 24 Drawing Sheets

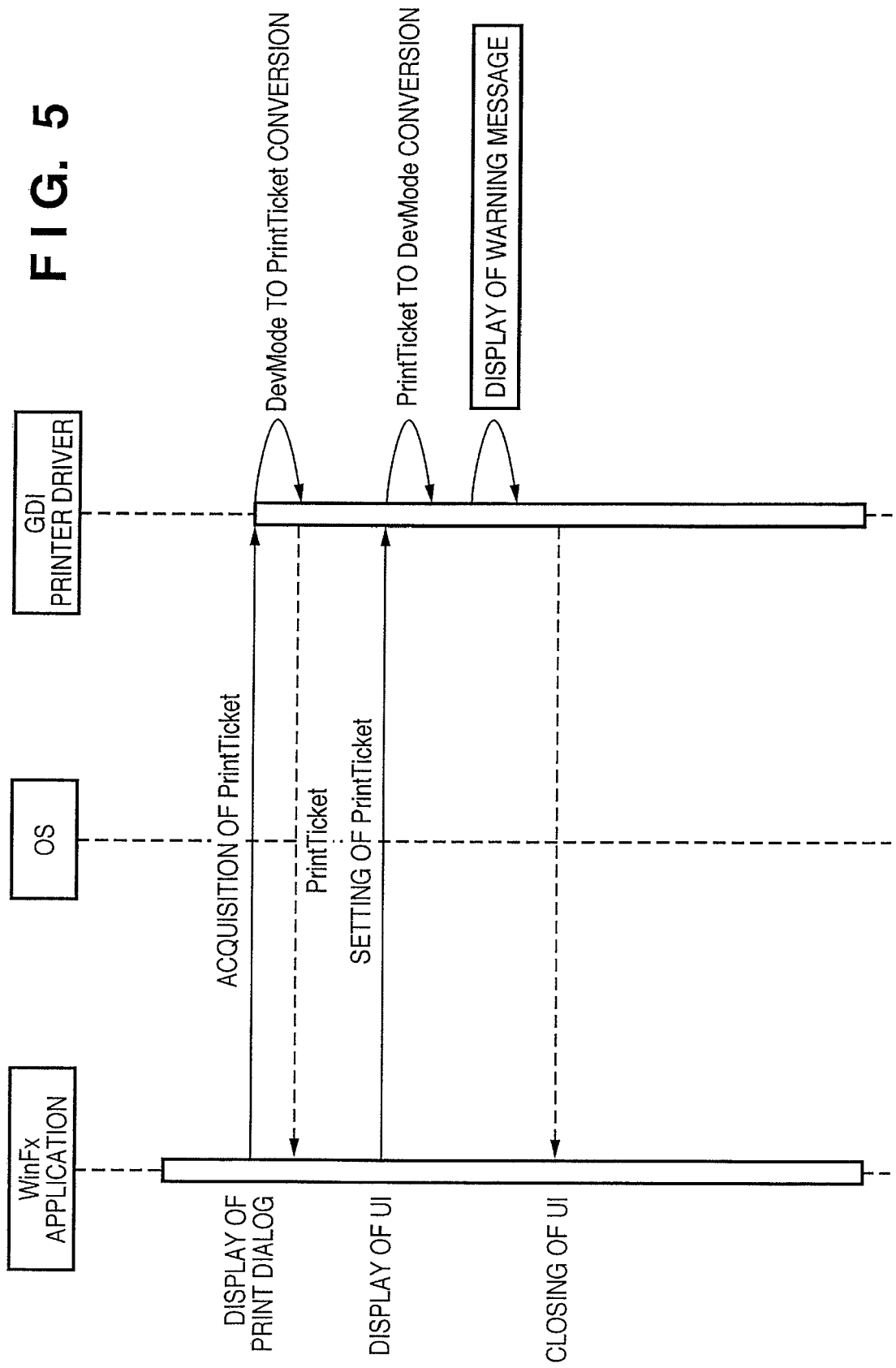

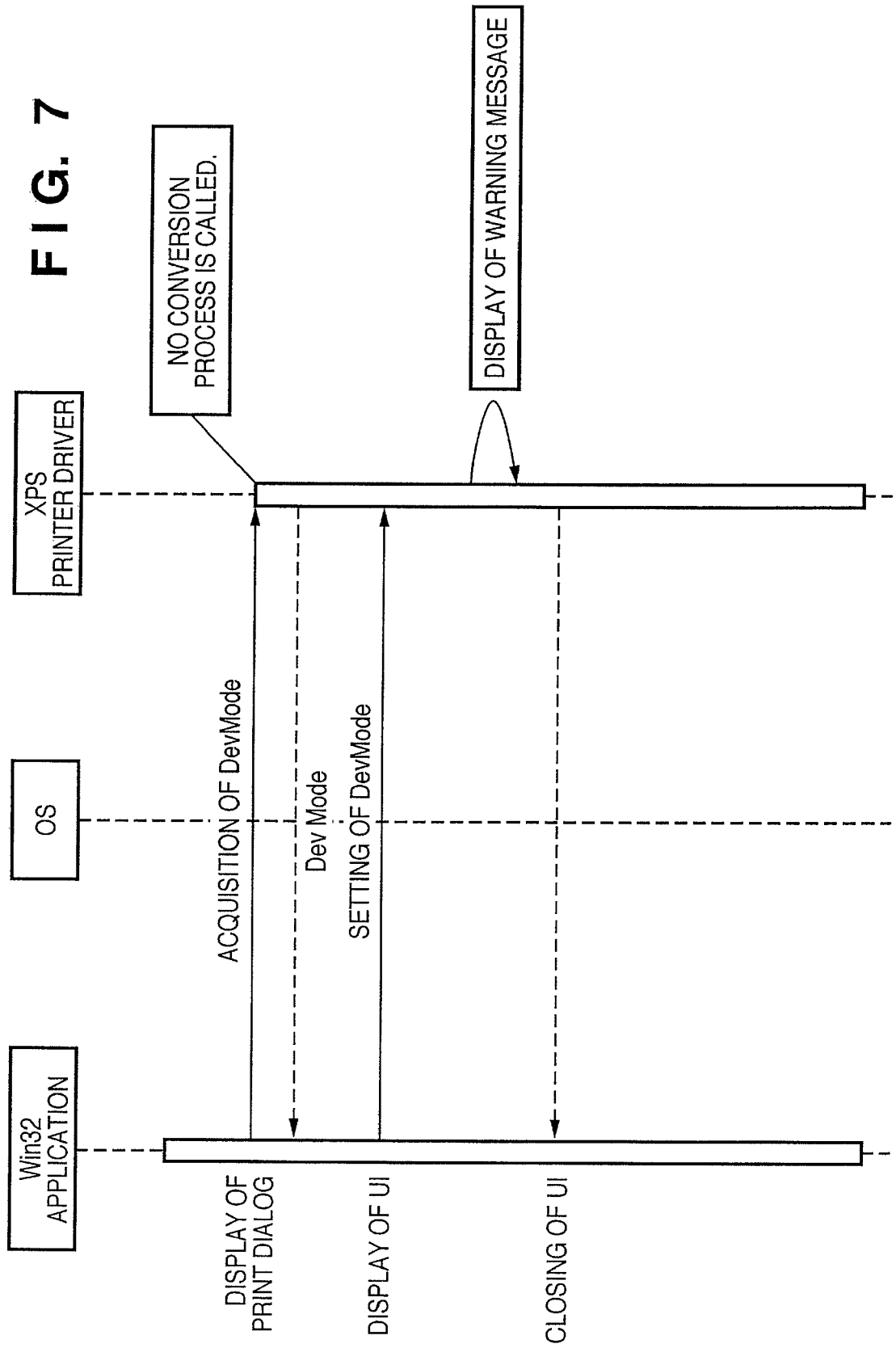

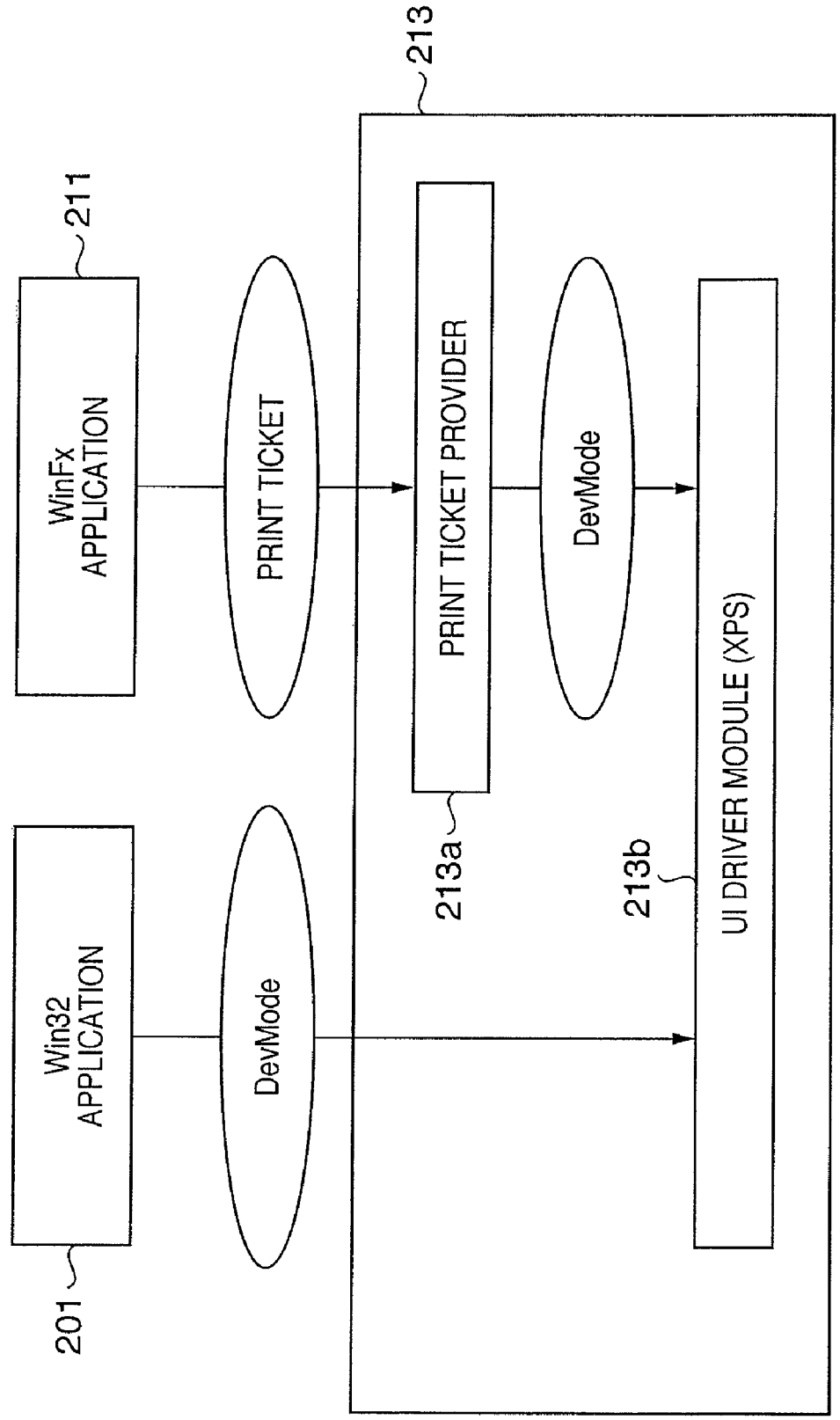

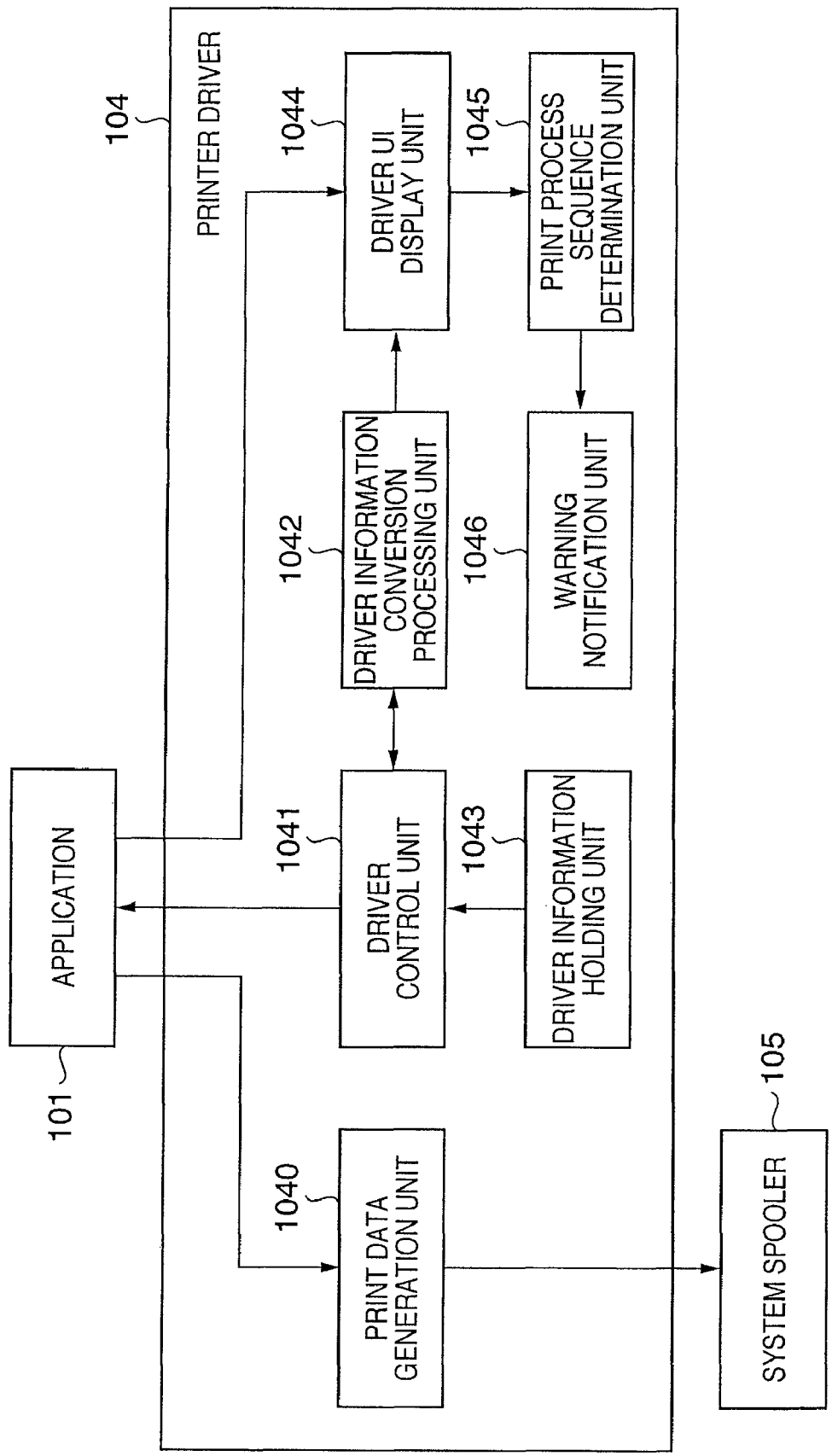

MANAGEMENT OF MULTIPLE PRINTER DRIVERS

BACKGROUND OF THE INVENTION

1. Field of the Invention

The present invention relates to an information processing apparatus in which a plurality of types of printer drivers and a plurality of types of graphics units run, a control method therefore, and a program.

2. Description of the Related Art

An application on a host computer prints an image or text from a printer by generally using an arrangement as shown in FIG. 1.

More specifically, an application 101 on a host computer 3000 passes graphics data to a graphics engine 103. The graphics engine 103 processes the graphics data and passes it to a printer driver 104. The printer driver 104 generates print data (e.g., PDL: Page Description Language) to a printer 1500. The print data is stored in a spooler 105 and then sent to the printer 1500.

In particular, the graphics engine 103 converts the resolution of graphics data created by the application 101, and processes graphics data by a simulation process or the like in accordance with the performance of the printer driver 104. The graphics engine 103 allows the application 101 and printer driver 104 to operate independently of each other. The graphics engine 103 is generally provided as part of an OS (Operating System) 102.

The number of graphics engines 103 is not always one, but may be two or more.

For example, Microsoft held a hardware engineering conference WinHEC 2005 in Seattle, U.S.A., in 2005. At this conference, Microsoft announced that a new Microsoft OS (Windows® Vista) supports two graphics engines (GDI 202 and WPF 212) as shown in FIG. 2. Daniel Emerson, "Advances in Windows Printing", WinHEC 2005 Conference, April 2005. The WPF stands for Windows® Presentation Foundation.

A conventional Microsoft printing system utilizes a graphics engine "GDI" from an application using an API called a Win32 API, and creates print data from graphics data by a printer driver called from the GDI. This print process sequence is called a GDI print path.

The API stands for Application Programming Interface. The GDI stands for Graphic Device Interface. An application using the Win32 API will be referred to as a Win32 application 201. A printer driver called from the GDI will be referred to as a GDI printer driver 203.

According to Windows® Vista, a new print process sequence called an XPS print path is added to the conventional GDI print path. The XPS print path is a print process sequence to convert XPS graphics data into print data by the printer driver using a graphics engine "WPF" from an application using a WinFx API.

The XPS stands for XML Paper Specification. An application using the WinEx API will be referred to as a WinFx application 211. A printer driver which processes XPS graphics data will be referred to as an XPS printer driver 213.

These graphics engines, i.e., GDI 202 and WPF 212 can cooperate with each other. With this cooperation, the Win32 application 201 can pass graphics data to the XPS printer driver 213, and the WinFx application 211 can pass graphics data to the GDI printer driver 203.

The cooperative mechanism of the two graphics engines in Windows® Vista will be explained with reference to FIG. 3.

A print process sequence (1) represents a conventional GDI print path. Graphics data passed from the Win32 application 201 is stored as an EMF (Enhanced Metafile) spool file 301 in the GDI 202. Then, the GDI printer driver 203 converts the EMF spool file 301 into print data.

A print process sequence (4) represents an XPS print path added in Windows® Vista. Graphics data passed from the WinFx application 211 is stored as an XPS spool file 311 in the WPF 212. Then, the XPS printer driver 213 converts the XPS spool file 311 into print data.

A print process sequence (3) represents a print process sequence when the GDI printer driver 203 prints graphics data from the WinFx application 211. Graphics data passed from the WinFx application 211 is converted into EMF graphics data by an XPS→GDI conversion module 312 via the WPF 212, and stored as the EMF spool file 301. Then, the GDI printer driver 203 converts the EMF spool file 301 into print data.

A print process sequence (2) represents a process sequence when the XPS printer driver 213 prints graphics data from the Win32 application 201. Graphics data passed from the Win32 application 201 is converted into XPS graphics data by a GDI→XPS conversion module 302 via the GDI 202, and stored as the XPS spool file 311. Then, the XPS printer driver 213 converts the XPS spool file 311 into print data.

In Windows® Vista, two graphics engines coexist and cooperate with each other, so the four print process sequences are conceivable. Either the GDI printer driver 203 or XPS printer driver 213 is prepared as a printer driver for a printer and can cope with print processes from both the Win32 application 201 and WinFx application 211.

There is proposed a print support technique of acquiring PDL information from a printer, selecting a proper driver, and if no proper driver exists, uploading it from a device, installing it, and printing by the installed driver (Japanese Patent Laid-Open No. 2004-021460).

The XPS and EMF formats are different. The print quality, print function, and print speed may degrade if a print process is executed using a print process sequence of converting graphics data, like the print process sequences (2) and (3) in FIG. 3.

In terms of the print function, for example, logical operation-containing graphics data supported by the EMF format is not supported by the XPS format in the print process sequence (2). The GDI→XPS conversion module 302 deletes logical operation information when converting EMF graphics data into XPS one. The XPS printer driver 213 receives graphics data having no logical operation information. When the user outputs the result created using the Win32 application 201 from the XPS printer driver 213, he may not obtain any intended output result.

To the contrary, advanced graphics graphics data supported by the XPS format is not supported by the EMF format in the print process sequence (3). The XPS→GDI conversion module 312 performs local bitmapping "Flattering" when converting XPS graphics data into GDI one. In this case, graphics data is converted into bitmap data, and the GDI printer driver 203 cannot determine the original object attribute, failing to obtain any user-intended output result.

In terms of the print function, for example, electronic signature information supported by the XPS format is not supported by the EMF format in the print process sequence (3). A process supported by the EMF format to directly notify the GDI printer driver 203 of information from an application is not supported by the XPS format in the print process sequence (2). For this reason, even if an application uses functions applicable to the print process sequences (1) and (4), these functions cannot be implemented in the print process sequences (2) and (3).

The print speeds in the print process sequences (2) and (3) are lower than those in the print process sequences (1) and (4) because of processes such as GDI→XPS conversion and XPS→GDI conversion.

It is, therefore, desirable to avoid the print process sequences (2) and (3). Even if both the XPS printer driver and GDI printer driver are registered for the same printer, the graphics engine in Windows® Vista does not dynamically switch to give priority to the print process sequence (1) or (4). In principle, the user does not recognize that the application is a Win32 or WinFx application or that there are four print process sequences. It is difficult to avoid the print process sequences (2) and (3).

Print setting information has print setting data in a data structure called the DevMode structure on the GDI print path, but has it in an XML data structure called PrintTicket on the XPS print path. Conversion from GDI to XPS or from XPS to GDI requires conversion from DevMode into PrintTicket or from PrintTicket into DevMode. Similar to graphics data, the DevMode expressible range and PrintTicket expressible range are different from each other. This process is done not automatically by the operating system but by the printer driver itself using an expanded architecture. No data is omitted, unlike graphics, if an IHV which creates a printer driver appropriately prepares a conversion process.

SUMMARY OF THE INVENTION

The present invention has been made to overcome the conventional drawbacks, and has as its object to provide an information processing apparatus capable of confirming an error generated by a graphics function for use before printing in an environment where graphics functions with different print data generation formats coexist, a control method therefore, and a program.

According to the present invention, the foregoing object is attained by providing an information processing apparatus which operates a first graphics unit that generates first graphics data processible by a first printer driver in accordance with a print instruction from a first application, and a second graphics unit that generates second graphics data processible by a second printer driver in accordance with a print instruction from a second application, comprising:
  determination means for determining whether a combination of an output requesting application and a printer driver designated as an output destination is a combination of the first application and the first printer driver or a combination of the second application and the second printer driver; and
  output means for, when the determination means determines that the combination of the output requesting application and the printer driver is neither the combination of the first application and the first printer driver nor the combination of the second application and the second printer driver, outputting confirmation information to confirm whether to execute a print process.

In a preferred embodiment, the output means outputs, as the confirmation information, information representing that the designated printer driver is not proper.

In a preferred embodiment, the first printer driver and the second printer driver have driver information of a first format, and comprise conversion means for converting the driver information of the first format into driver information of a second format.

In a preferred embodiment,
  when the conversion means executes conversion, the determination means of the first printer driver determines that the combination of the output requesting application and the printer driver is neither the combination of the first application and the first printer driver nor the combination of the second application and the second printer driver, and
  when the conversion means does not execute conversion, the determination means of the second printer driver determines that the combination of the output requesting application and the printer driver is neither the combination of the first application and the first printer driver nor the combination of the second application and the second printer driver.

In a preferred embodiment, the output means outputs information representing a proper printer driver as the confirmation information.

In a preferred embodiment,
  when the determination means determines that the combination of the output requesting application and the printer driver is neither the combination of the first application and the first printer driver nor the combination of the second application and the second printer driver, the determination means determines whether a proper printer driver which corresponds to a printer driver name selected to execute a print process is installed for the same printer, and
  when the proper printer driver is installed for the same printer, the output means outputs information representing the installed proper printer driver as the confirmation information.

In a preferred embodiment, the determination means determines, as the proper printer driver, a printer driver having the same printer driver name as a printer driver name of a selected printer driver.

In a preferred embodiment, the determination means determines, as the proper printer driver, a printer driver having the same printer driver name and the same output destination information as a printer driver name and output destination information of a selected printer driver.

In a preferred embodiment, when no proper printer driver is installed, the output means outputs information representing an acquisition site of the proper printer driver as the confirmation information.

In a preferred embodiment, when no proper printer driver is installed, the output means outputs, as the confirmation information, information to confirm whether to install the proper printer driver.

According to the present invention, the foregoing object is attained by providing an information processing apparatus which operates a first graphics unit that generates first graphics data processible by a first printer driver in accordance with a print instruction from a first application, and a second graphics unit that generates second graphics data processible by a second printer driver in accordance with a print instruction from a second application, comprising:
  determination means for determining whether a process path is to convert the first graphics data into the second graphics data and output the second graphics data to the second printer driver; and
  output means for, when the determination means determines the process path, outputting confirmation information to confirm whether to execute a print process.

According to the present invention, the foregoing object is attained by providing a method of controlling an information processing apparatus which operates a first graphics unit that generates first graphics data processible by a first printer driver in accordance with a print instruction from a first application, and a second graphics unit that generates second graphics data processible by a second printer driver in accordance with a print instruction from a second application, comprising:

a determination step of determining whether a combination of an output requesting application and a printer driver designated as an output destination is a combination of the first application and the first printer driver or a combination of the second application and the second printer driver; and an output step of, when the combination of the output requesting application and the printer driver is determined in the determination step to be neither the combination of the first application and the first printer driver nor the combination of the second application and the second printer driver, outputting confirmation information to confirm whether to execute a print process.

According to the present invention, the foregoing object is attained by providing a method of controlling an information processing apparatus which operates a first graphics unit that generates first graphics data processible by a first printer driver in accordance with a print instruction from a first application, and a second graphics unit that generates second graphics data processible by a second printer driver in accordance with a print instruction from a second application, comprising:

a determination step of determining whether a process path is to convert the first graphics data into the second graphics data and output the second graphics data to the second printer driver; and an output step of, when the process path is determined in the determination step, outputting confirmation information to confirm whether to execute a print process.

According to the present invention, the foregoing object is attained by providing a computer program which is stored in a computer-readable medium and causes a computer to control an information processing apparatus which operates a first graphics unit that generates first graphics data processible by a first printer driver in accordance with a print instruction from a first application, and a second graphics unit that generates second graphics data processible by a second printer driver in accordance with a print instruction from a second application, causing the computer to execute a determination step of determining whether a combination of an output requesting application and a printer driver designated as an output destination is a combination of the first application and the first printer driver or a combination of the second application and the second printer driver, and an output step of, when the combination of the output requesting application and the printer driver is determined in the determination step to be neither the combination of the first application and the first printer driver nor the combination of the second application and the second printer driver, outputting confirmation information to confirm whether to execute a print process.

According to the present invention, the foregoing object is attained by providing a computer program which is stored in a computer-readable medium and causes a computer to control an information processing apparatus which operates a first graphics unit that generates first graphics data processible by a first printer driver in accordance with a print instruction from a first application, and a second graphics unit that generates second graphics data processible by a second printer driver in accordance with a print instruction from a second application, causing the computer to execute a determination step of determining whether a process path is to convert the first graphics data into the second graphics data and output the second graphics data to the second printer driver, and an output step of, when the process path is determined in the determination step, outputting confirmation information to confirm whether to execute a print process.

Further features of the present invention will be apparent from the following description of exemplary embodiments with reference to the attached graphics.

BRIEF DESCRIPTION OF THE GRAPHICS

FIG. 5 is a sequence chart when a WinFx application activates a GDI printer driver according to the first embodiment of the present invention;

FIG. 7 is a sequence chart when a Win32 application activates an XPS printer driver according to the first embodiment of the present invention;

FIG. 8A is a block diagram showing the arrangement of the XPS printer driver according to the first embodiment of the present invention;

FIG. 8B is a block diagram showing the internal functional arrangement of the printer driver according to the first embodiment of the present invention;

DESCRIPTION OF THE EMBODIMENTS

Preferred embodiments of the present invention will now be described in detail with reference to the graphics. It should be noted that the relative arrangement of the components, the numerical expressions and numerical values set forth in these embodiments do not limit the scope of the present invention unless it is specifically stated otherwise.

First Embodiment

Figure 3:
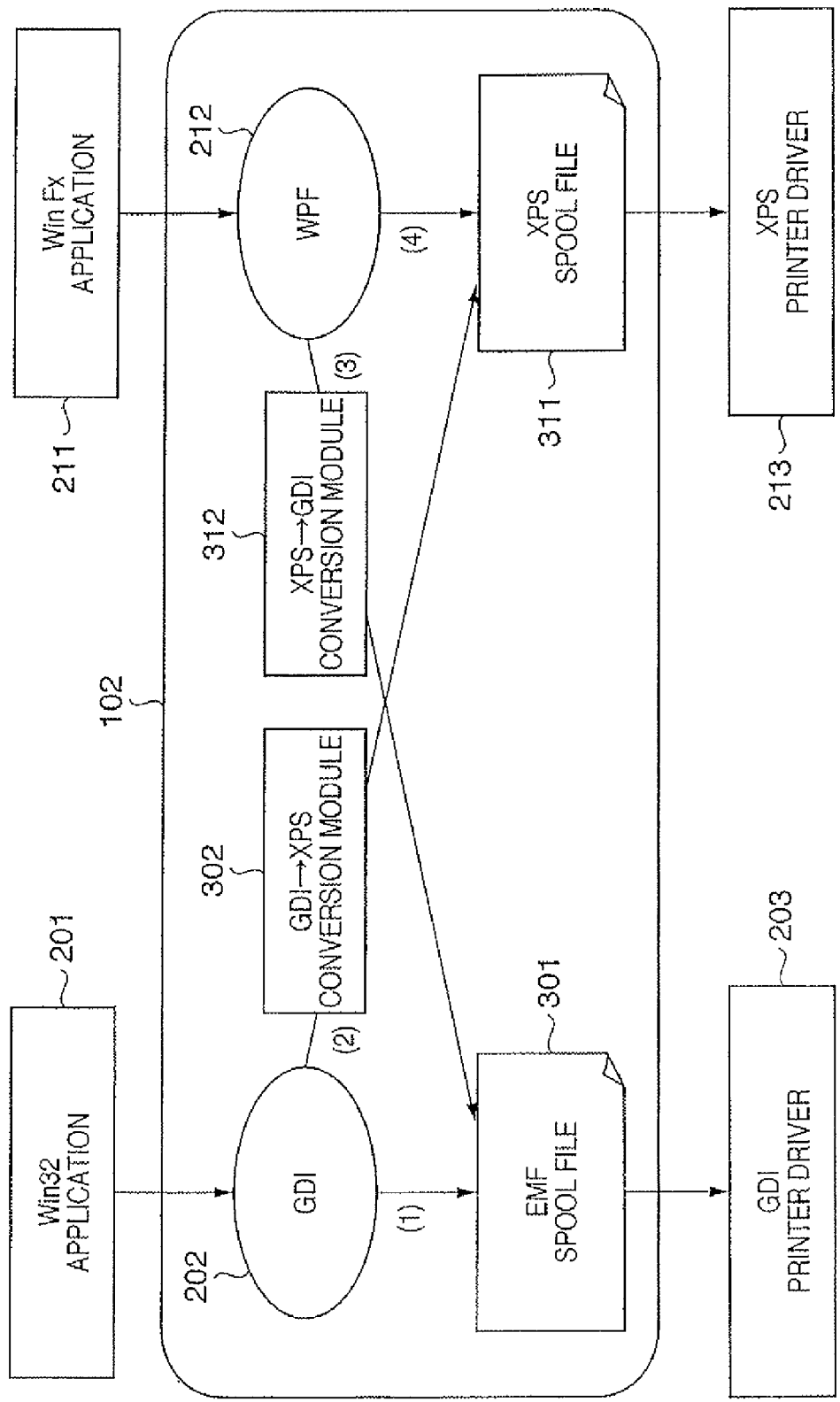
FIG. 3 is a block diagram for explaining the cooperative mechanism of graphics engines in Windows® Vista.

FIG. 3 is a block diagram for explaining the cooperative mechanism of two graphics engines in Windows® Vista.

A print process sequence (1) represents a conventional GDI print path. Graphics data passed from a Win32 application 201 is stored as an EMF (Enhanced Metafile) spool file 301 in a GDI 202. Then, a GDI printer driver 203 converts the EMF spool file 301 into print data.

A print process sequence (4) represents an XPS print path added in Windows® Vista. Graphics data passed from a WinFx application 211 is stored as an XPS spool file 311 in a WPF 212. Then, an XPS printer driver 213 converts the XPS spool file 311 into print data.

A print process sequence (3) represents a print process sequence when the GDI printer driver 203 prints graphics data from the WinFx application 211. Graphics data passed from the WinFx application 211 is converted into EMF graphics data by an XPS→GDI conversion module 312 via the WPF 212, and stored as the EMF spool file 301. Then, the GDI printer driver 203 converts the EMF spool file 301 into print data.

A print process sequence (2) represents a process sequence when the XPS printer driver 213 prints graphics data from the Win32 application 201. Graphics data passed from the Win32 application 201 is converted into XPS graphics data by a GDI→XPS conversion module 302 via the GDI 202, and stored as the XPS spool file 311. Then, the XPS printer driver 213 converts the XPS spool file 311 into print data.

In Windows® Vista, two graphics engines coexist and cooperate with each other, so the four print process sequences are conceivable. Either the GDI printer driver 203 or XPS printer driver 213 is prepared as a printer driver for a printer and can cope with print processes from both the Win32 application 201 and WinFx application 211.

Figure 1:
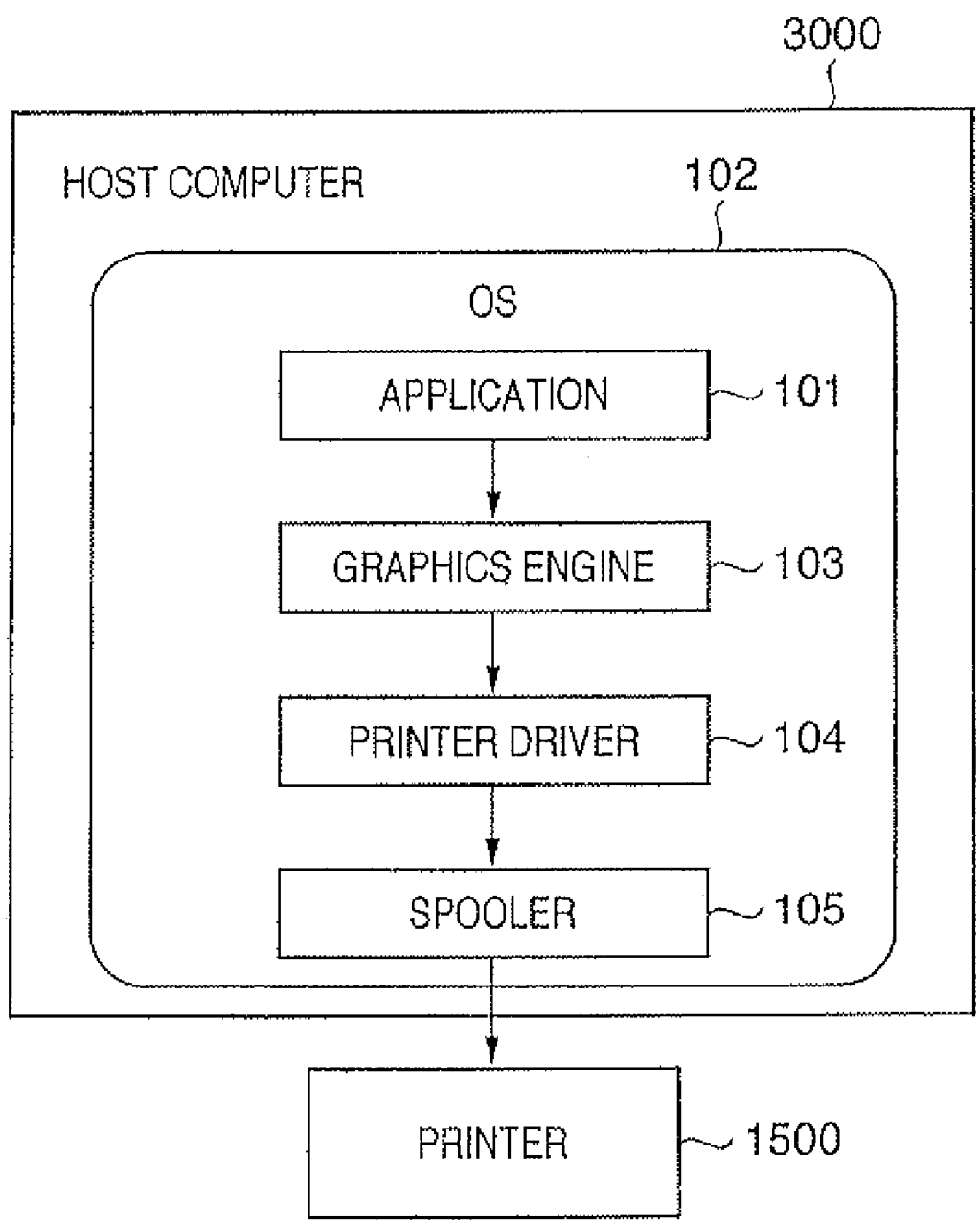
FIG. 1 is a block diagram showing an overall general print control system.
Figure 2:
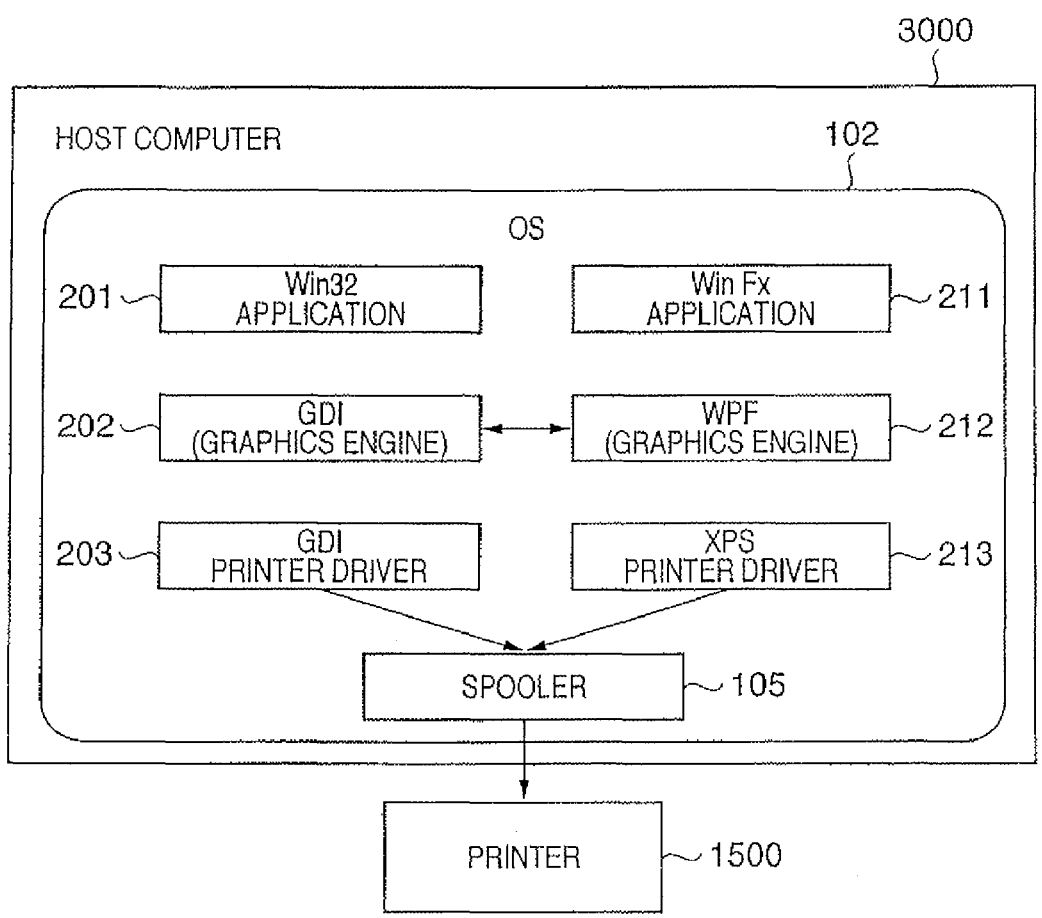
FIG. 2 is a block diagram showing an overall Windows® Vista printing system.

In FIGS. 2 and 3, an information processing apparatus comprises the Win32 application 201 serving as the first application, and the GDI printer driver 203 serving as the first printer driver. The information processing apparatus also comprises the WinFx application 211 serving as the second application, and the XPS printer driver 213 serving as the second printer driver.

The two graphics engines, i.e., the GDI 202 serving as the first graphics unit and the WPF 212 serving as the second graphics unit exist on the OS. The Win32 application passes a GDI function serving as the first graphics data to the GDI 202, while the WinFx application 211 passes WPF API data serving as the second graphics data to the WPF 212.

The GDI printer driver 203 receives graphics data from the GDI 202 and converts it into print data for a printer 1500. The XPS printer driver 213 receives graphics data from the WPF 212 and converts it into print data for the printer 1500. Print data created by the printer driver is transmitted to the printer 1500 via a spooler 105.

Figure 4A:
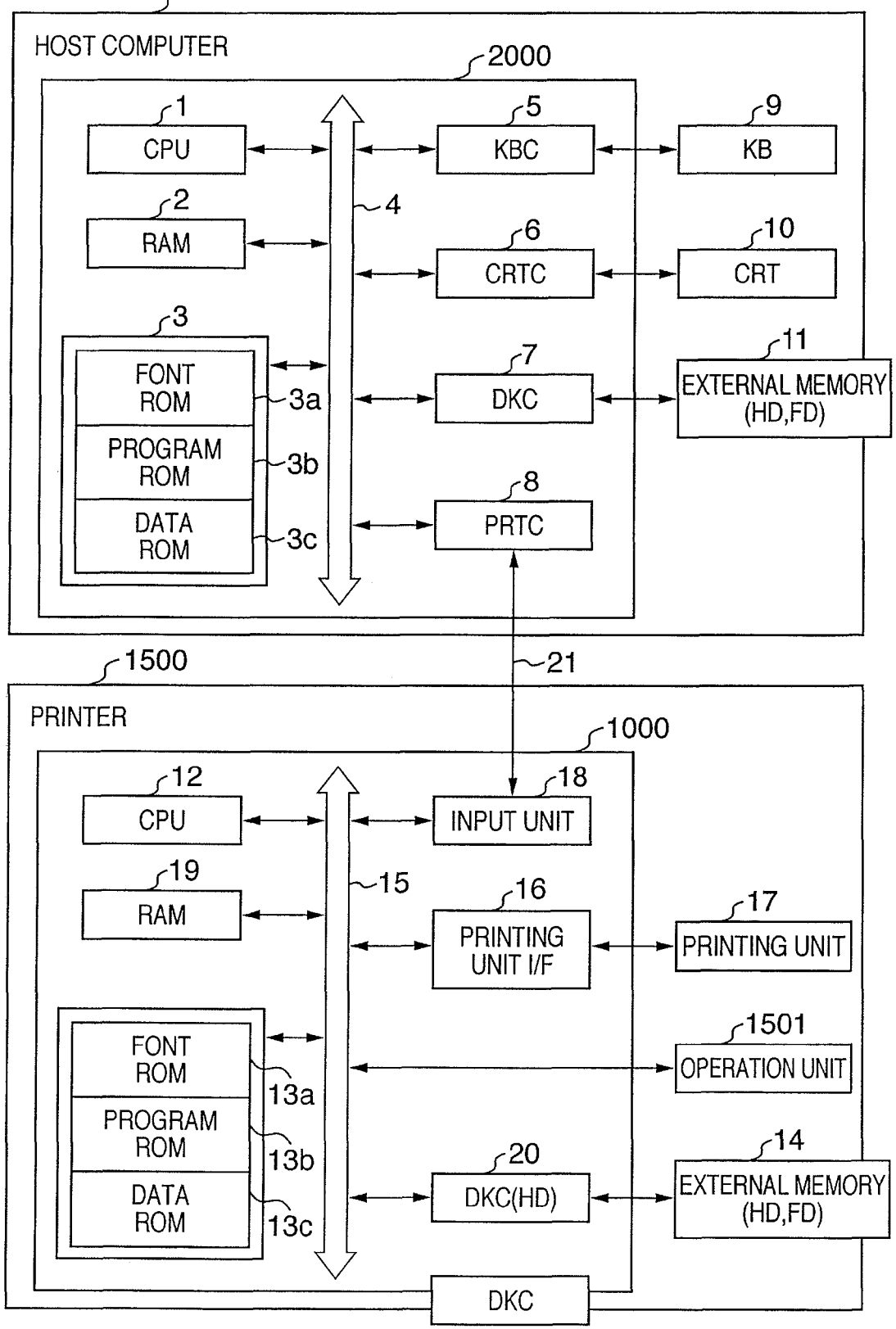
FIG. 4A is a block diagram for explaining the configuration of a printer control system including a computer according to the first embodiment of the present invention.

FIG. 4A is a block diagram for explaining the configuration of a printer control system including the information processing apparatus (host computer) according to the first embodiment of the present invention.

The present invention is applicable to a system having the functions of a single device or formed from a plurality of devices as far as the system can execute the functions of the present invention, unless otherwise specified. The present invention is also applicable to a system which is connected via a network such as a LAN or WAN to perform processes.

In FIG. 4A, reference numeral 3000 denotes a host computer having a CPU 1. The CPU 1 processes a document of building elements such as a figure, image, text, table (including a spreadsheet and the like), and the like on the basis of a document processing program (application program) stored in a program ROM 3b of a ROM 3 or an external memory 11. The CPU 1 comprehensively controls each device connected to a system bus 4 in a host computer main body 2000.

The program ROM 3b of the ROM 3 or the external memory 11 stores programs such as an operating system program (to be referred to as an OS hereinafter) which is a control program for the CPU 1. A font ROM 3a of the ROM 3 or the external memory 11 stores data such as font data used in the document process. A data ROM 3c of the ROM 3 or the external memory 11 stores various data used to perform various processes such as the document process.

Reference numeral 2 denotes a RAM functioning as a main memory, work area, and the like for the CPU 1. Reference numeral 5 denotes a keyboard controller (KBC) which controls a key input from a keyboard (KB) 9 or a pointing device (not shown). Reference numeral 6 denotes a CRT controller (CRTC) which controls display on a CRT display (CRT) 10. An LCD controller and LCD are also available instead of the CRT controller 6 and CRT display 10.

Reference numeral 7 denotes a disk controller (DKC) which controls access to the external memory 11 for a boot program, various applications, font data, user files, edit files, and the like. The DKC 7 also controls access to the external memory 11 (e.g., a hard disk (HD) or floppy® disk (FD)) which stores various data such as a print control command generation program (to be referred to as a printer driver hereinafter).

Reference numeral 8 denotes a printer controller (PRTC) which connects to the printer 1500 via a predetermined bidirectional interface 21, and executes a communication control process with the printer 1500. Examples of the bidirectional interface are a USB interface, IEEE1394 interface, and wireless LAN interface.

The CPU 1 enables WYSIWYG on the CRT 10 by expanding (rasterizing) an outline font in a display information RAM set in, e.g., the RAM 2 to provide a GUI. The CPU 1 opens various registered windows and executes various data processes on the basis of commands designated with the mouse cursor (not shown) or the like on the CRT 10. In printing, the user opens a window associated with print settings, and sets the printer and a printing method to the printer driver including selection of the print mode.

In the printer 1500, reference numeral 12 denotes a printer CPU. The printer CPU 12 comprehensively controls each device connected to a system bus 5 in a printer control unit 1000. The printer CPU 12 outputs an image signal serving as output information to a printing unit (printer engine) 17 connected to the system bus 5 on the basis of a program such as a control program stored in a program ROM 13b of a ROM 13 or an external memory 14.

The program ROM 13b of the ROM 13 stores programs such as a control program for the printer CPU 12. A font ROM 13a of the ROM 13 stores data such as font data used to generate the output information. When the printer does not comprise any external memory 14 such as a hard disk (HD) or IC card, a data ROM 13c of the ROM 13 stores information or the like used in the host computer 3000.

The printer CPU 12 can communicate with the host computer 3000 via an input unit 18, and can notify the host computer 3000 of various types of information such as status information in the printer 1500. Reference numeral 19 denotes a RAM functioning as a main memory, work area, and the like for the CPU 12. The RAM 19 can increase its memory capacity by an optional RAM connected to an expansion port (not shown).

The RAM 19 is used as an output information expansion area, environment data storage area, NVRAM, and the like. A disk controller (DKC) 20 controls access to the external memory 14. The external memory 14 is connected as an option, and stores data such as font data, an emulation program, and form data. Reference numeral 1501 denotes an operation unit having an operation panel, switch, LED display, and the like for various operations to the printer 1500.

The number of external memories 14 is not limited to one, and but is at least one. It is possible to connect a plurality of external memories which store a built-in font, an optional font card, and a program for interpreting printer control languages of different language systems. The external memory 14 may have an NVRAM (not shown) to store printer mode setting information from the operation unit 1501.

The functional arrangement of the host computer 3000 will be explained with reference to FIG. 4B.

Figure 4B:
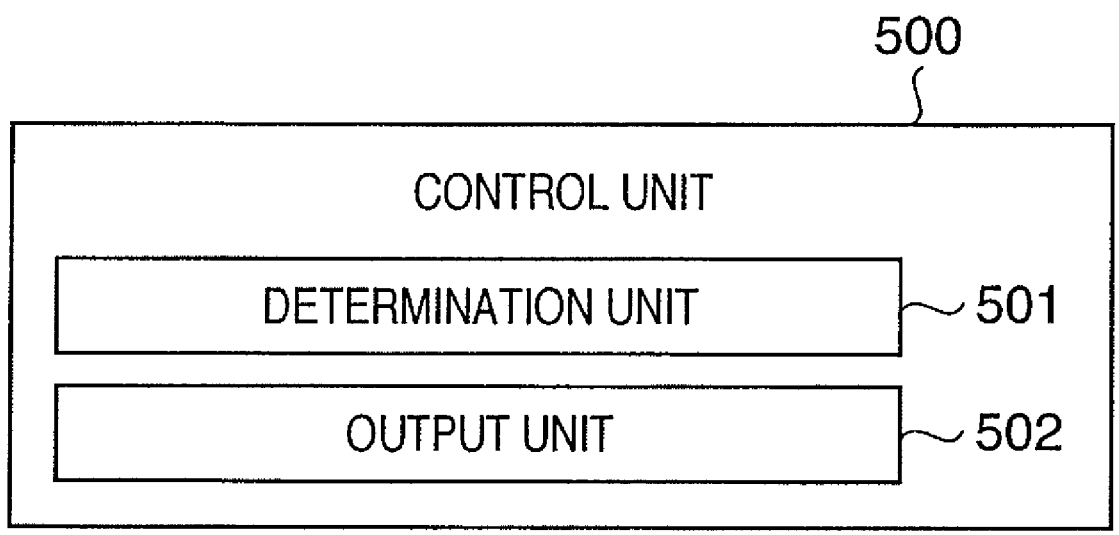
FIG. 4B is a block diagram showing the functional arrangement of a host computer according to the first embodiment of the present invention.

FIG. 4B is a block diagram showing the functional arrangement of the host computer according to the first embodiment of the present invention.

A control unit 500 implemented by the CPU of the host computer 3000 controls a determination unit 501 and output unit 502, and executes various processes (e.g., processes shown in the flowcharts of FIGS. 9 to 12, 14, 16, 18, and 20) implemented by various programs.

The control unit 500 controls the first graphics unit which generates the first graphics data processible by the first printer driver in accordance with a print instruction from the first application, and the second graphics unit which generates the second graphics data processible by the second printer driver in accordance with a print instruction from the second application.

The determination unit 501 determines whether a combination of an output requesting application and a printer driver designated as an output destination is a combination of the first application and first printer driver or a combination of the second application and second printer driver. And the determination unit 501 determines whether a process path is to convert the first graphics data into the second graphics data and output the second graphics data to the second printer driver.

If the determination unit 501 determines that the combination of the output requesting application and the printer driver is neither of these combinations, the output unit 502 outputs confirmation information to confirm whether to execute a print process.

And if the determination unit 501 determines the process path which is to convert the first graphics data into the second graphics data and output the second graphics data to the second printer driver, the output unit 502 outputs confirmation information to confirm whether to execute a print process.

FIG. 4B shows merely an arrangement corresponding to constituent features defined in independent claim 1. Arrangements corresponding to dependent claims of independent claim 1 are also implemented in the control unit.

An outline of the process in the first embodiment will be explained with reference to FIG. 3.

The user displays a print dialog from an application in printing, and displays the user interface (UI) of the printer driver. At this time, if the user does not grasp the type of selected application and that of selected printer driver, he cannot know which print process sequence runs.

The type of application is the Win32 application 201 or WinFx application 211. The type of printer driver is the CDI printer driver 203 or XPS printer driver 213.

A feature of the first embodiment is to display a warning to the user when the print process sequence in FIG. 3 is (2) or (3) upon displaying the printer driver UI, i.e., to output confirmation information to confirm whether to execute a print process.

The printer driver holds driver information in the DevMode format. The Win32 application 201 uses DevMode, while the WinFx application 211 uses DevMode or PrintTicket.

If the application requests PrintTicket, the GDI printer driver 203 must convert DevMode into PrintTicket. It can be determined that the print process sequence is (3) when the GDI printer driver 203 converts DevMode into PrintTicket.

Also when the application requests PrintTicket, the XPS printer driver 213 must convert DevMode into PrintTicket. In the print process sequence (2), the Win32 application 201 requests DevMode, so the XPS printer driver 213 does not convert it into PrintTicket. When the XPS printer driver 213 does not perform any conversion, it can be determined that the XPS printer driver 213 is highly likely to follow the print process sequence (2). However, it cannot be concluded that the print process sequence is (2) because the WinFx application 211 may request DevMode (print process sequence (4)).

This process sequence will be explained with reference to the sequence charts of FIGS. 5 and 7.

FIG. 5 is a sequence chart when the WinFx application activates the GDI printer driver according to the first embodiment of the present invention.

In printing, the user displays the print dialog of the WinFx application 211. At this time, the WinFx application 211 activates the GDI printer driver 203 to request PrintTicket as printer driver information. Since the GDI printer driver 203 holds only DevMode, it converts DevMode into PrintTicket, and notifies the WinFx application 211 of the PrintTicket.

To make detailed print settings from the WinFx application 211, the user instructs the GCD printer driver 203 via the WinFx application 211 to display the UI of the GDI printer driver 203. The WinFx application 211 sets PrintTicket (if any change is made through the print dialog, including the change) for the GDI printer driver 203. The GDI printer driver 203 converts the PrintTicket into DevMode, and displays the UT.

Since the GDI printer driver 203 converts DevMode into PrintTicket at the time of start-up, it determines that it has received a print instruction from the WinFx application 211. A graphics error and degradation of the print process function are expected, and the GDI printer driver 203 displays a warning message shown in FIG. 6A.

When the Win32 application 201 activates the GDI printer driver 203, it requests the GDI printer driver 203 to acquire DevMode. The GDI printer driver 203 need not execute conversion into PrintTicket. Neither a graphics error nor degradation of the print process function is expected, so the GDI printer driver 203 does not display any warning in particular. That is, when PrintTicket is requested of the GDI printer driver 203, it can be determined that the print process sequence is (3).

FIG. 7 is a sequence chart when the Win32 application activates the XPS printer driver according to the first embodiment of the present invention.

In printing, the user displays the print dialog of the Win32 application 201. At this time, the Win32 application 201 activates the XPS printer driver 213 to request DevMode as driver information. Since the XPS printer driver 213 holds DevMode, it notifies the Win32 application 201 of the DevMode.

To make detailed print settings from the Win32 application 201, the user instructs the XPS printer driver 213 via the Win32 application 201 to display the UI of the XPS printer driver 213. The Win32 application 201 sets DevMode (if any change is made through the print dialog, including the change) for the XPS printer driver 213. The XPS printer driver 213 displays the UI using the DevMode.

When called from the WinFx application 211, the XPS printer driver 213 should convert DevMode into PrintTicket. However, the XPS printer driver 213 does not convert DevMode into PrintTicket at the time of start-up. Thus, the XPS printer driver 213 determines that it has received a print instruction from the Win32 application 201. A graphics error and degradation of the print process function are expected, so the XPS printer driver 213 displays a warning message shown in FIG. 6B. Since the WinFx application 211 may request DevMode, the XPS printer driver 213 notifies the Win32 application 201 of the possibility of the print process sequence (2).

An outline of the process in the first embodiment has been described. A concrete arrangement to implement this process will be explained, The arrangement of the XPS printer driver will be described with reference to FIG. 8A.

FIG. 8A is a block diagram showing the arrangement of the XPS printer driver according to the first embodiment of the present invention.

The XPS printer driver 213 holds a print ticket provider 213a and UI driver module (XPS) 213b. The UI driver module (XPS) 213b is based on DevMode, and displays a UI for setting print setting information in response to a call from an application. The print ticket provider 213a converts PrintTicket (print ticket) into DevMode or DevMode into PrintTicket.

In FIG. 8A, when the Win32 application 201 requests DevMode for print settings, the UI driver module of the XPS printer driver 213 is based on DevMode and does not require any conversion. If the Win32 application 201 prints using the XPS printer driver 213, the print ticket provider 213a need not perform any conversion.

To the contrary, the WinFx application 211 requests a print ticket for print settings. The XPS printer driver 213 does not hold any print ticket, and the print ticket provider 213a converts the print ticket into DevMode.

The XPS printer driver 213 can recognize the conversion process of the print ticket provider 213a. If the XPS printer driver 213 recognizes that the print ticket provider 213a converts a print ticket into DevMode, it can determine that the print setting requesting source is the WinFx application 211. If the print ticket provider 213a does not execute any conversion, the XPS printer driver 213 can determine that the print setting requesting source is the Win32 application.

The GDI printer driver 203 is identical in structure to the XPS printer driver 213, and comprises a UI driver module (GDI) equivalent to the UI driver module (XPS) 213b. The GDI printer driver is also based on DevMode.

The GDI printer driver 203 can recognize the conversion process of the print ticket provider 213a, similar to the XPS printer driver 213. The GDI printer driver 203 can determine the process path of data to be printed and a print setting requesting application.

The internal functional arrangement of the printer driver in the first embodiment will be explained with reference to FIG. 8B.

FIG. 8B is a block diagram showing the internal functional arrangement of the printer driver according to the first embodiment of the present invention.

Reference numeral 101 denotes an application; 104, a printer driver; and 105, a system spooler. Reference numeral 1041 denotes a driver control unit which acquires driver information from a driver information holding unit 1043. If necessary, a driver information conversion processing unit 1042 converts its driver information (e.g., DevMode) into another format, and notifies the application of the converted driver information.

Reference numeral 1044 denotes a driver UI display unit which displays a UI on the basis of driver information received from the application 101, and inquires whether the driver information conversion processing unit 1042 has performed conversion.

Figure 6A:
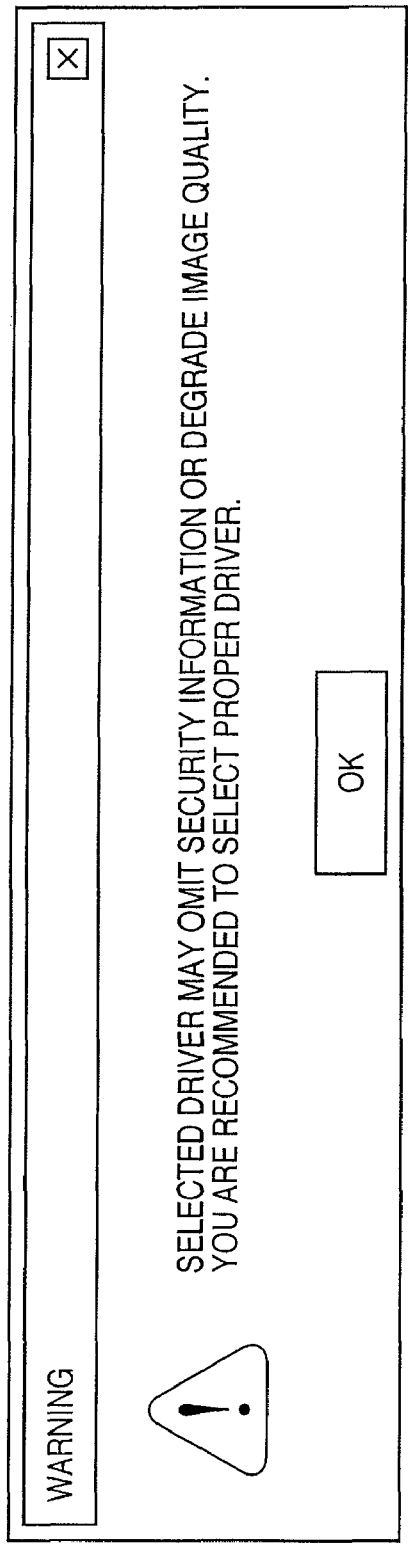
FIG. 6A is a view showing a window example of a warning display UI according to the first embodiment of the present invention.
Figure 6B:
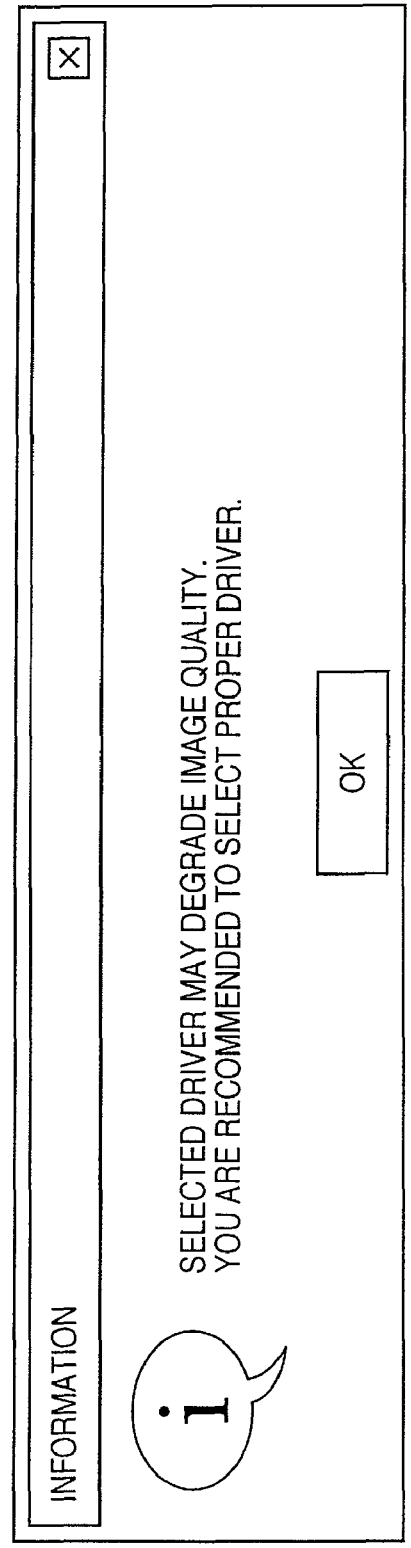
FIG. 6B is a view showing another window example of the warning display UI according to the first embodiment of the present invention.

Reference numeral 1045 denotes a print process sequence determination unit which receives, from the driver information conversion processing unit 1042, information representing whether it has performed conversion, and determines whether the print process sequence is (2) or (3). When the printer driver is the GDI printer driver and conversion has been done, the print process sequence determination unit 1045 determines that the print process sequence is not proper. When the printer driver is the XPS printer driver and no conversion has been done, the print process sequence determination unit 1045 determines that the print process sequence may not be proper. Reference numeral 1046 denotes a warning notification unit which outputs warning information (warning message) as shown in FIG. 6A or 6B when the print process sequence determination unit 1045 determines that the print process sequence is not proper.

The operation of the GDI printer driver will be explained with reference to FIG. 9.

Figure 9:
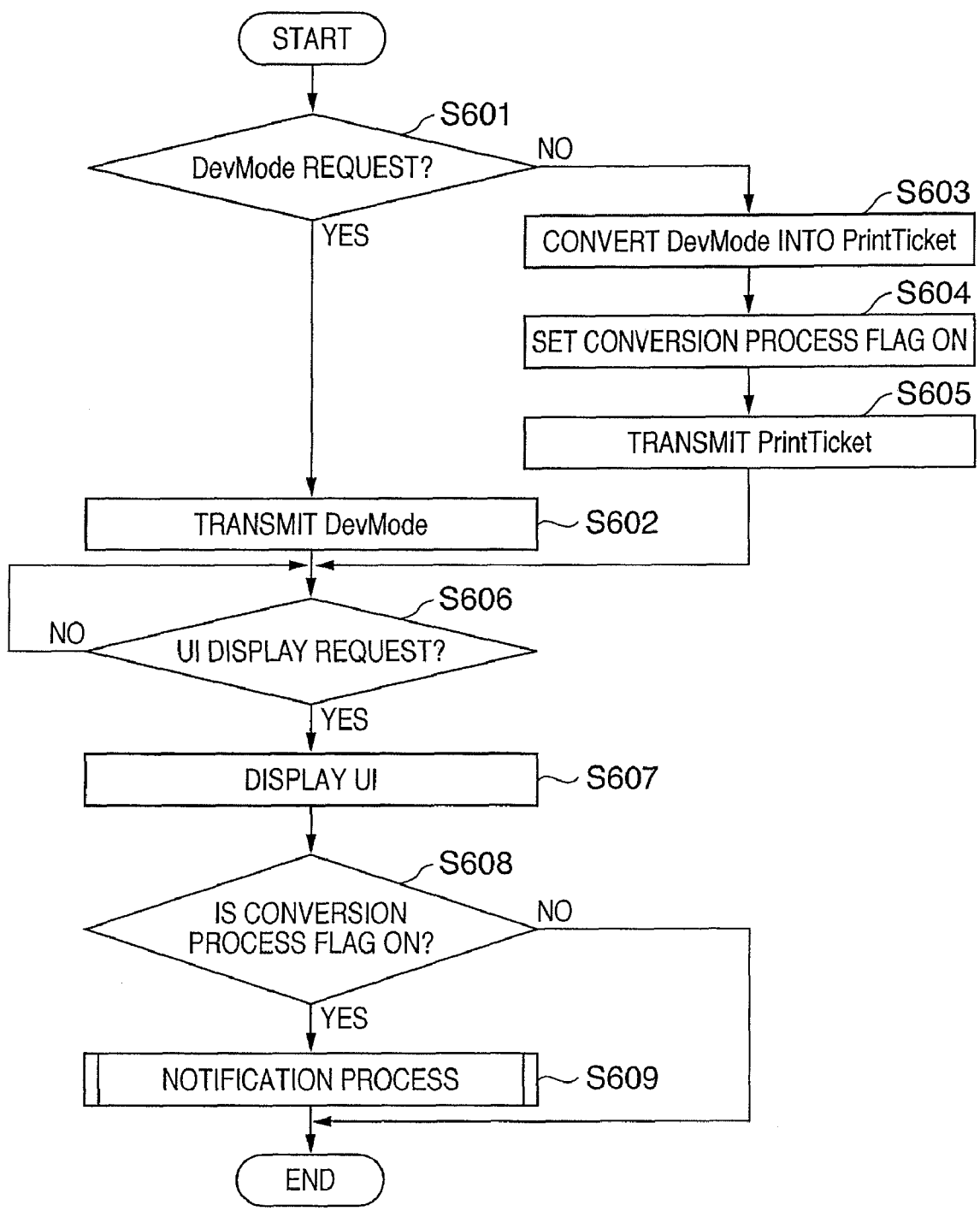
FIG. 9 is a flowchart showing the operation of the GDI printer driver according to the first embodiment of the present invention.

FIG. 9 is a flowchart showing the operation of the GDI printer driver according to the first embodiment of the present invention. The CPU 1 of the host computer 3000 serving as an information processing apparatus shown in FIG. 4A executes each step of the flowchart.

In the process, the GDI printer driver has a conversion process flag as a work area, and the initial value of the flag is OFF.

In step S601, the driver control unit 1041 determines whether the driver information request from the application is a DevMode request or PrintTicket request. If the driver information request is a DevMode request (YES in step S601), the process advances to step S602 to notify the application of DevMode.

If the driver control unit 1041 determines that the driver information request is a PrintTicket request (NO in step S601), the process advances to step S603 to convert DevMode into PrintTicket. More specifically, if the print ticket provider 213*a* shown in FIG. 8A (driver information conversion processing unit 1042 in FIG. 9) receives a PrintTicket request, it converts DevMode into PrintTicket. Since the print ticket provider 213*a* has converted DevMode into PrintTicket in step S603, the conversion process flag is set ON to this effect in step S604. The RAM 2 of the host computer 3000 saves whether the conversion process flag is ON or OFF. In step S605, the driver control unit 1041 notifies the application of the converted PrintTicket.

In step S606, the driver UI display unit 1044 determines whether it has received a UI display request from the application. If the driver UI display unit 1044 has not received any UI display request (NO in step S606), the process waits until the driver UI display unit 1044 receives a UI display request. If the driver UI display unit 1044 has received a UI display request (YES in step S606), the process advances to step S607.

In step S607, the driver UI display unit 1044 displays a driver UI. In step S608, the warning notification unit 1046 determines whether the conversion process flag is ON.

Since the RAM 2 saves the conversion process flag in the process of step S604, the warning notification unit 1046 can make determination in step S608 by referring to the RAM 2.

If the warning notification unit 1046 determines in step S608 that the conversion process flag is ON (YES in step S608), the process advances to step S609 to notify the user of, e.g., a warning message shown in FIG. 6A, and then ends. If the conversion process flag is OFF (NO in step S608), the process ends without notifying the user of any warning message.

In FIG. 9, the conversion process flag is determined (step S608) after displaying the driver UI (step S607), but the order of these steps is arbitrary. It suffices to execute the determination process in step S608 after the user issues a UI display request.

That is, the GDI printer driver determines in FIG. 9 whether a combination of a print instructing application and a printer driver designated as an output destination is a combination of the Win32 application and GDI printer driver. If the GDI printer driver determines that the combination of the print instructing application and printer driver is not a combination of the Win32 application and GDI printer driver, it outputs information in step S609 to confirm whether to execute a print process.

Details of the process in step S609 will be described with reference to FIG. 10.

Figure 10:
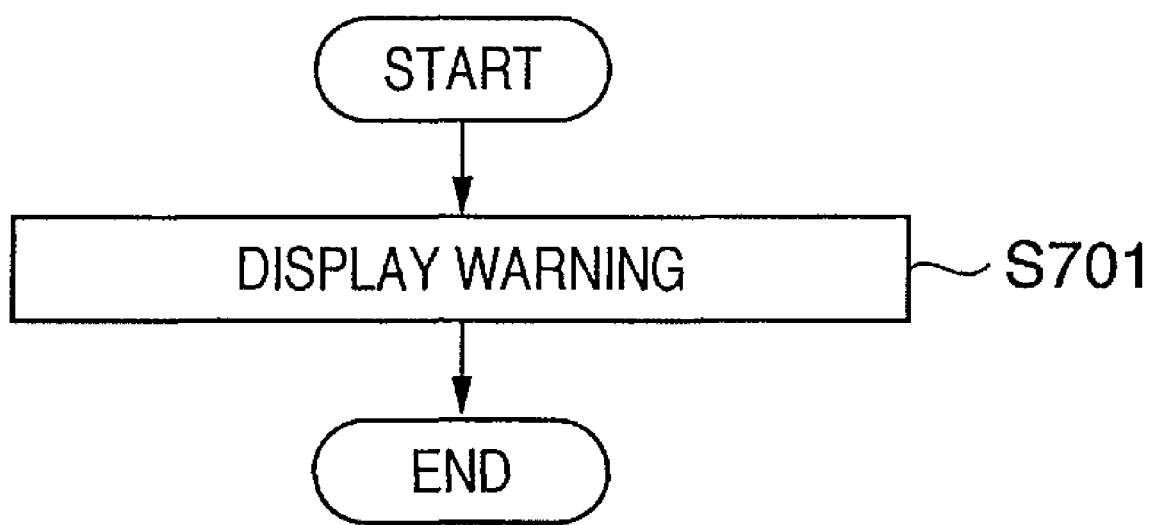
FIG. 10 is a flowchart showing details of the process in step S609 according to the embodiment of the present invention.

FIG. 10 is a flowchart showing details of the process in step S609 according to the embodiment of the present invention.

The flowchart in FIG. 10 explains details of step S609 and step S809 (to be described later).

In step S701, for example, if the selected printer driver is the GDI printer driver, it displays a message box (warning message) shown in FIG. 6A to the user. If the selected printer driver is the XPS printer driver, it displays a message box (warning message) shown in FIG. 6B. The message can warn the user that the currently selected printer driver does not follow a proper print process sequence.

The operation of the XPS printer driver will be described with reference to FIG. 11.

Figure 11:
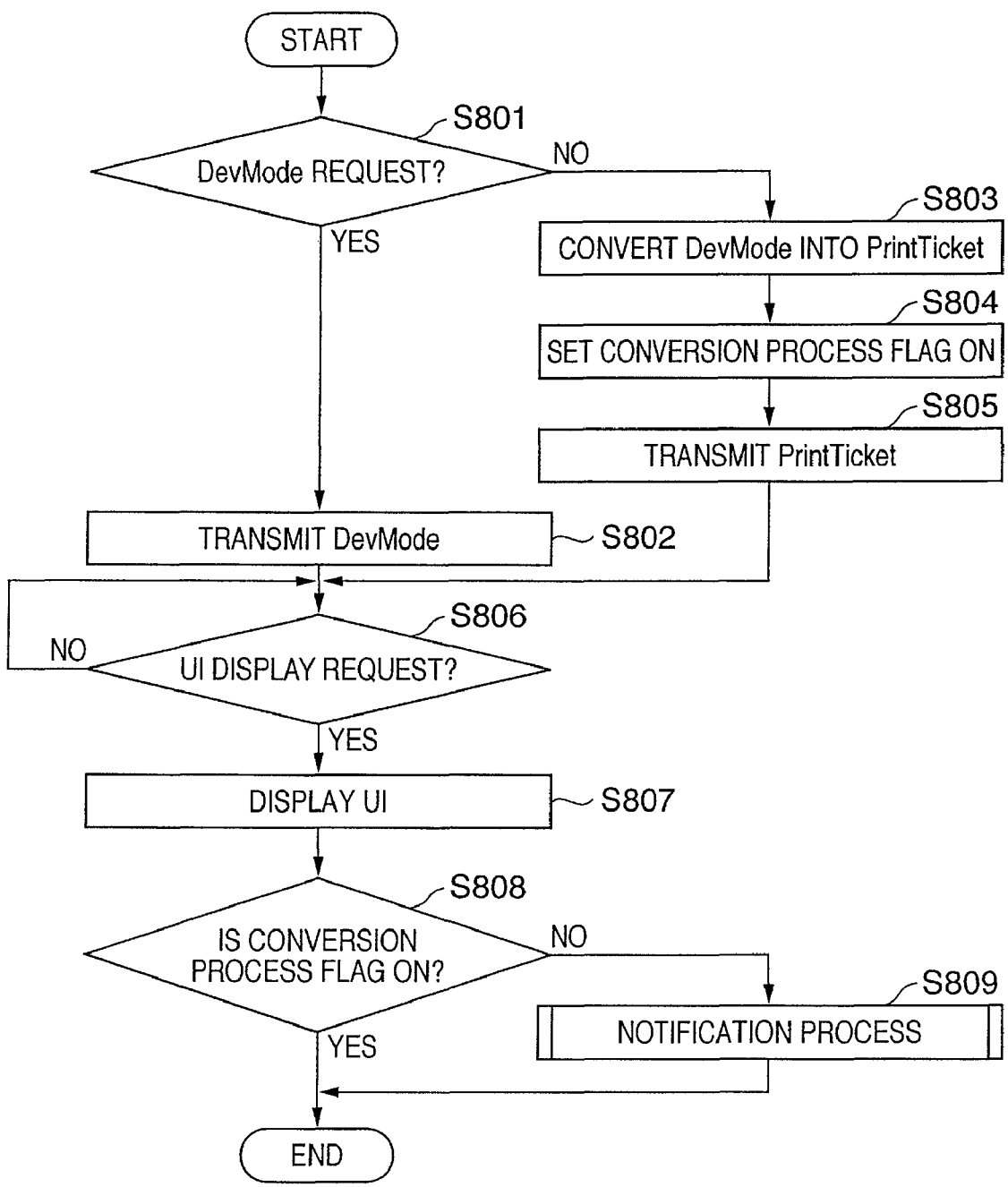
FIG. 11 is a flowchart showing the operation of the XPS printer driver according to the first embodiment of the present invention.

FIG. 11 is a flowchart showing the operation of the XPS printer driver according to the first embodiment of the present invention.

In FIG. 11, the processes in steps S801 to S807 correspond to those in steps S601 to S607 of the flowchart in FIG. 9, and details thereof will be omitted.

After the process in step S807, the warning notification unit 1046 determines in step S808 whether the conversion process flag is ON. If the conversion process flag is ON (YES in step S808), the process ends. If the conversion process flag is OFF (NO in step S808), the process advances to step S809, the warning notification unit 1046 notifies the user, and then the process ends. When the XPS printer driver does not execute conversion into PrintTicket, it determines that a graphics error and degradation of the print process function occur, as described above. Thus, if the warning notification unit 1046 determines in step S808 that the conversion process flag is OFF, it displays a warning message shown in FIG. 6B.

That is, the XPS printer driver determines in FIG. 11 whether a combination of a print instructing application and a printer driver designated as an output destination is a combination of the WinFx application and XPS printer driver. If the XPS printer driver determines that the combination of the print instructing application and printer driver is not a combination of the WinFx application and XPS printer driver, it outputs information in step S809 to confirm whether to execute a print process.

As described above, according to the first embodiment, the printer driver determines whether a driver selected via an application is appropriate, and outputs confirmation information (warning information) in accordance with the determination result. This can improve user friendliness while preventing degradation of the image quality and performance, omission of security information, and the like.

Second Embodiment

In the first embodiment, the printer driver determines whether a driver selected via an application is appropriate, and warns the user in accordance with the determination result that the print process sequence is not appropriate. However, the user may not know which printer driver is proper, and may be notified of a proper printer driver name.

In this arrangement, printer drivers hold partner driver names in addition to the work area described in the first embodiment. Assume that there are a GDI printer driver "LBP XXXX(GDI)" and an XPS printer driver "LBP XXXX (XPS)" as printer drivers of a printer "LBP XXXX". In this case, the driver information holding unit of the GDI printer driver holds an XPS printer driver name, whereas the driver information holding unit of the XPS printer driver holds a GDI printer driver name.

The operation of the printer driver is the same as that in the first embodiment except for the notification processes in steps S609 and S809.

Details of the notification process will be explained with reference to FIG. 12. Step S1201 of FIG. 12 is executed when it is determined in step S609 of FIG. 9 or step S809 of FIG. 11 to generate a warning.

Figure 12:
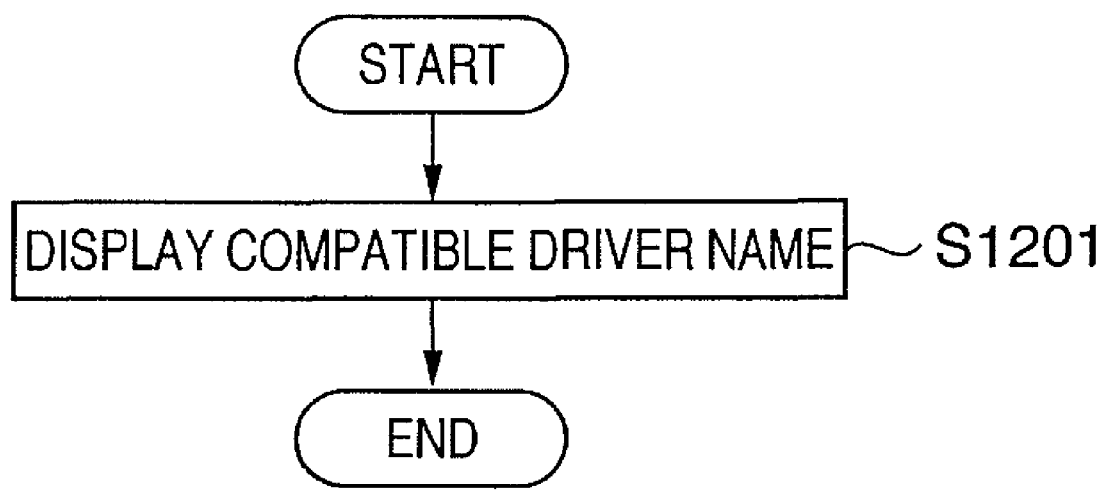
FIG. 12 is a flowchart showing details of a notification process according to the second embodiment of the present invention.

FIG. 12 is a flowchart showing details of the notification process according to the second embodiment of the present invention.

Figure 13A:
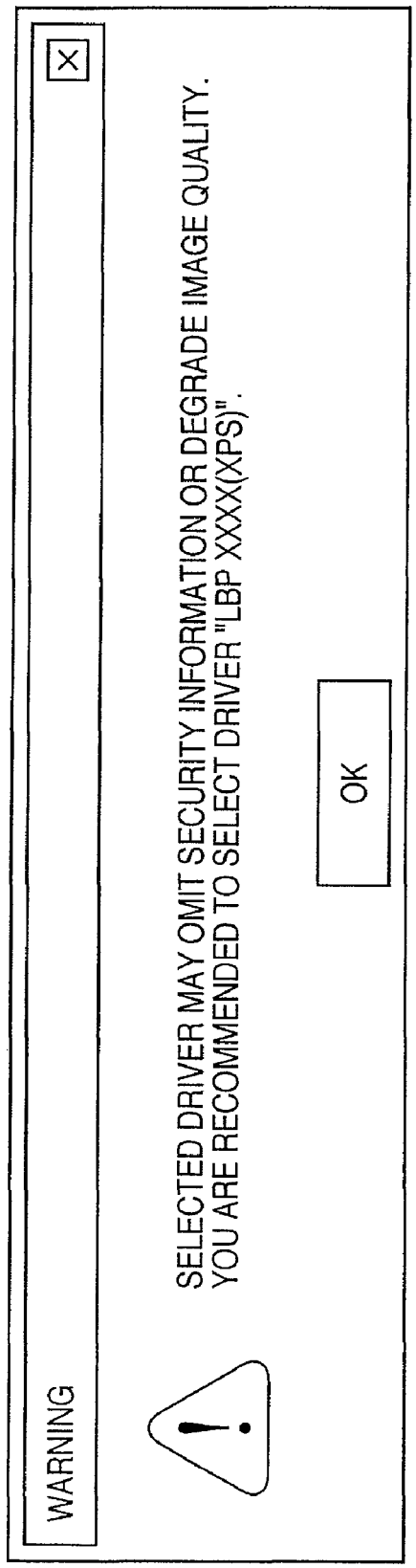
FIG. 13A is a view showing a window example of a UI which notifies the user of a proper driver name according to the second embodiment of the present invention.

If a warning notification unit 1046 of the CDI printer driver determines that the conversion flag is ON, it displays a message box shown in FIG. 13A. The driver information holding unit holds the name (e.g., LBP XXXX(GDI)) of the GDI printer driver and the name (e.g., LBP XXXX(XPS)) of the compatible printer driver.

Figure 13B:
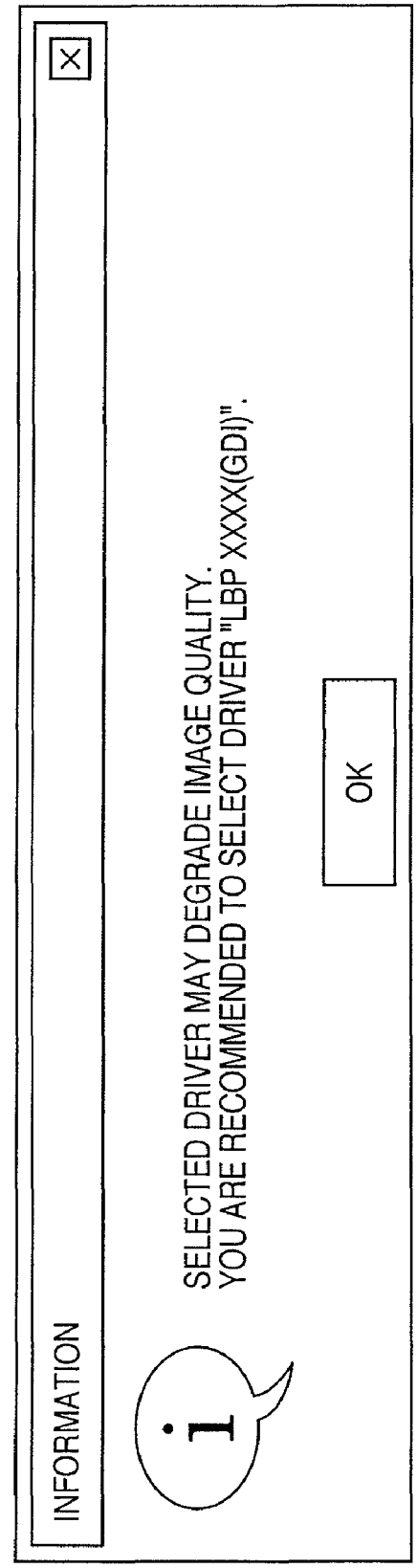
FIG. 13B is a view showing another window example of the UI which notifies the user of a proper driver name according to the second embodiment of the present invention.

If the warning notification unit 1046 determines to generate a warning, it reads out the compatible printer driver name from the driver information holding unit, and displays, e.g., the message box shown in FIG. 13A. The basic process is the same as for the XPS printer driver. However, if the selected printer driver is the XPS printer driver, the warning notification unit 1046 displays a message box shown in FIG. 13B when determining that the conversion flag is OFF. In this manner, the printer driver outputs information representing a proper printer driver as confirmation information.

As described above, according to the second embodiment, the printer driver warns the user that the currently selected printer driver is not appropriate, and notifies the user of the name of a printer driver expected to be appropriate. The user can easily select an appropriate printer driver.

Third Embodiment

The second embodiment has been described on the assumption that each printer driver holds a compatible printer driver name. If each printer driver does not hold a compatible printer driver name, it cannot notify the user of a proper printer driver name. In the third embodiment, it may be determined whether a proper printer driver compatible with a selected printer driver is installed in a host computer for the same printer, notifying the user that the proper printer is installed.

In this arrangement, the printer driver forms PrinterInfo holding the number N of listed printers and printer information in addition to the work area described in the second embodiment. The initial value of the number N of printers is 0. PrinterInfo holds information by the number of listed printers. The driver operation is the same as that in the first embodiment except for the notification processes in steps S609 and S809.

Details of the notification process will be explained with reference to FIG. 14.

Figure 14:
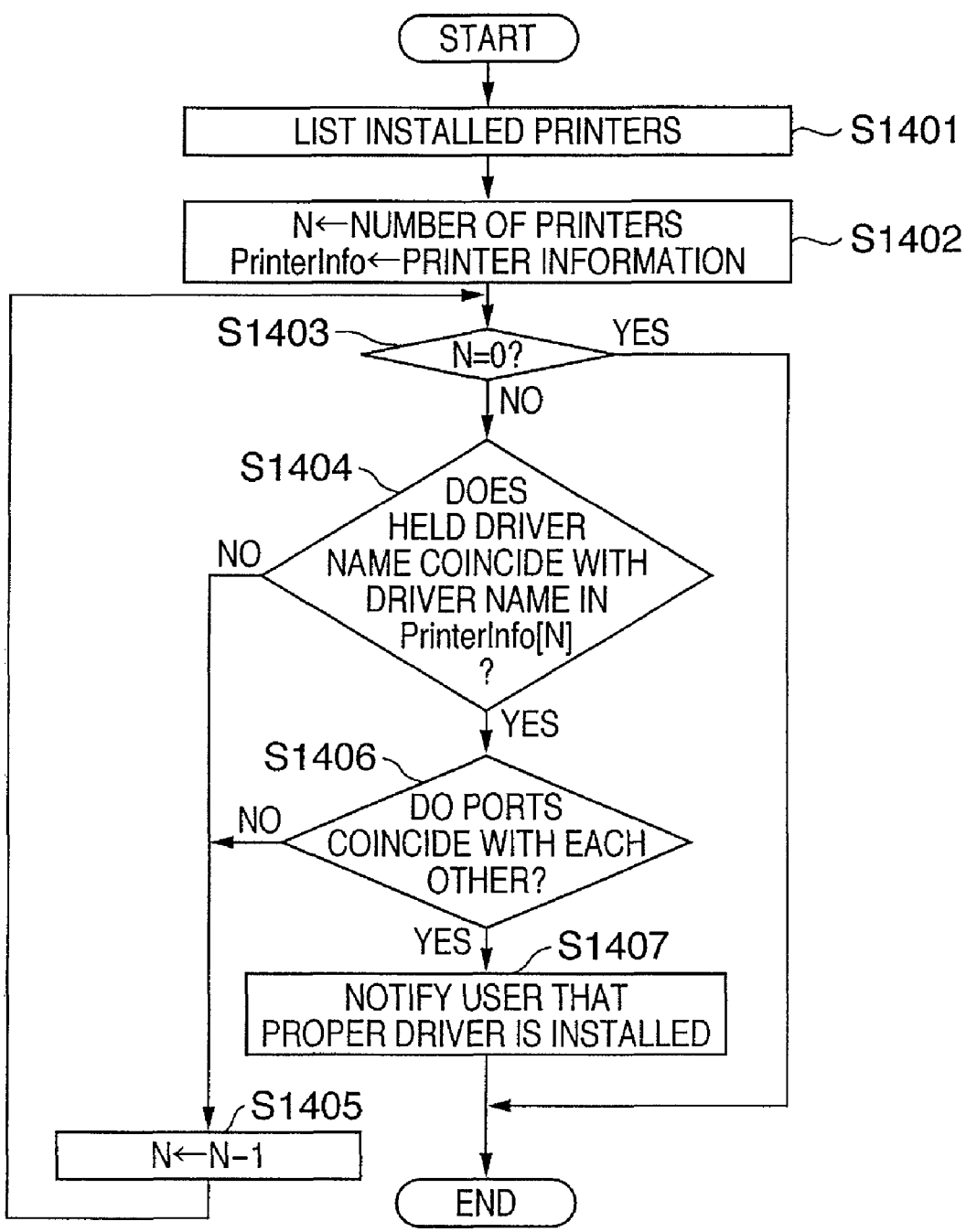
FIG. 14 is a flowchart showing details of a notification process according to the third embodiment of the present invention.

FIG. 14 is a flowchart showing details of the notification process according to the third embodiment of the present invention. The process in FIG. 14 is executed when the warning notification unit determines in FIGS. 9 and 11 to generate a warning.

In step S1401, a driver control unit 1041 lists printers installed in a host computer 3000. Since a RAM 2 holds information on printers installed in the host computer 3000, the printer driver refers to the RAM 2 to list installed printers. In step S1402, the driver control unit 1041 sets the number of listed printers to N, and sets the listed printer information in PrinterInfo.

In step S1403, the driver control unit 1041 determines whether the number N of printers=0. If N=0 (YES in step S1403), all printers have been checked or no printer driver can be listed, and the process ends. If N≠0 (NO in step S1403), the process advances to step S1404.

In step S1404, the driver control unit 1041 determines whether the Nth printer driver name in PrinterInfo coincides with a printer driver name held in a driver information holding unit 1043. If these printer driver names do not coincide with each other (NO in step S1404), the process advances to step S1405 to decrement N, and then returns to step S1403.

If the driver control unit 1041 determines that these printer driver names coincide with each other (YES in step S1404), the process advances to step S1406. The driver control unit 1041 determines whether the ports of the selected printer driver and Nth printer driver, whose names are determined to coincide with each other, coincide with each other. More specifically, PrinterInfo holds port information of each printer driver, and the driver control unit 1041 refers to PrinterInfo to make determination in step S1406.

An individual port is assigned to each printer driver, and held by the driver information holding unit 1043 of the printer driver. For a network port, if the IP addresses of the selected printer driver and Nth printer driver coincide with each other, it may be determined that their network ports coincide with each other.

If the driver control unit 1041 determines that the ports of the selected printer driver and Nth printer driver do not coincide with each other (NO in step S1406), the process advances to step S1405. If the driver control unit determines that these ports coincide with each other (YES in step S1406), the process advances to step S1407.

Figure 15A:
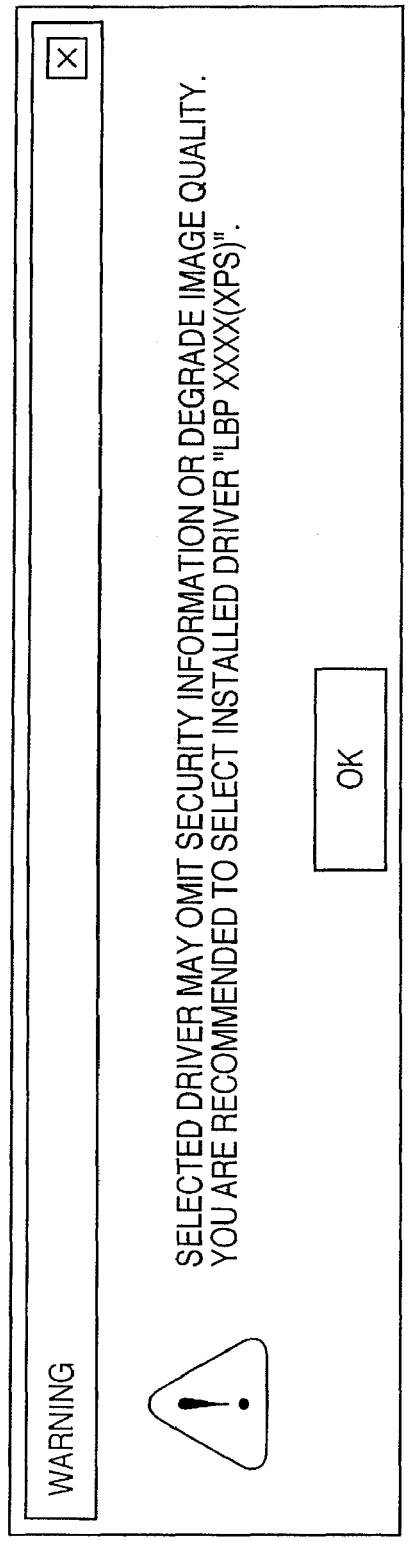
FIG. 15A is a view showing a window example of a US which notifies the user that a proper driver is installed according to the third embodiment of the present invention.
Figure 15B:
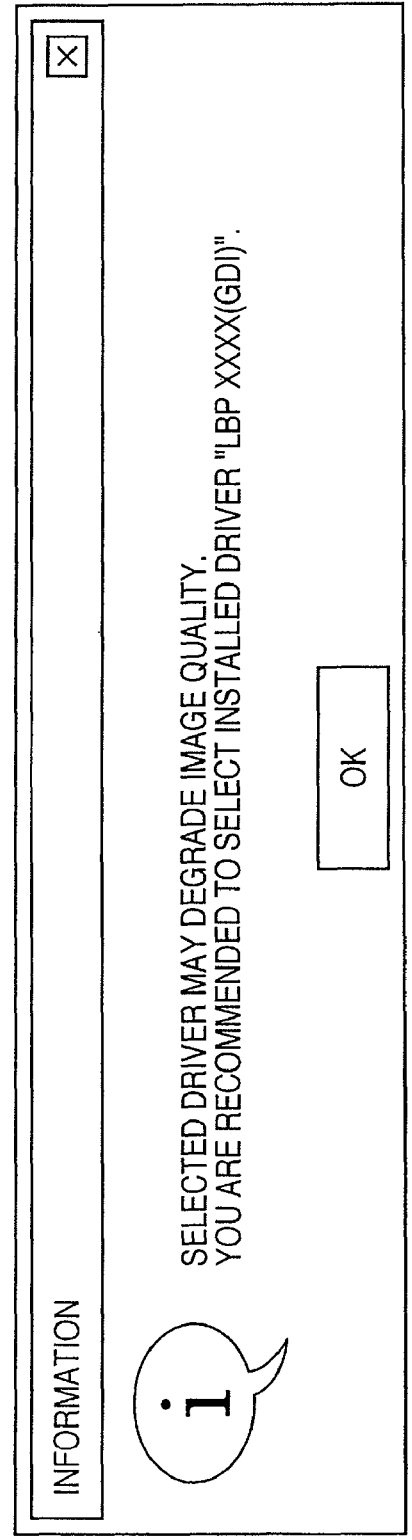
FIG. 15B is a view showing another window example of the UI which notifies the user that a proper driver is installed according to the third embodiment of the present invention.

In step S1407, for example, if the selected printer driver is the GDI printer driver, its warning notification unit 1046 displays a message box shown in FIG. 15A. If the selected printer driver is the XPS printer driver, its warning notification unit 1046 displays a message box shown in FIG. 15B.

In the third embodiment, whether the ports of printer drivers coincide with each other is confirmed after confirming whether their names coincide with each other, but the order of these steps may be reverse.

As described above, according to the third embodiment, the printer driver warns that the currently selected printer driver is not proper. The printer driver recommends, as a proper printer driver, a printer driver with the same name and port (output destination information) as those of the selected printer driver. The user can recognize a printer driver expected to be able to execute an appropriate print process, without grasping all printer drivers held in the host computer.

Fourth Embodiment

According to the third embodiment, the printer driver notifies the user that a proper printer driver is installed for the same printer as that of the printer driver. When there is a printer whose printer driver is installed with a different port, the printer driver may notify the user of a message to this effect. In this case, the user can use an appropriate printer driver by only switching the port.

The printer driver forms OtherPortPrnInfo holding information on a printer using the same printer driver with different ports in addition to the work area described in the third embodiment. The operation of the printer driver is the same as that in the first embodiment except for the notification processes in steps S609 and S809.

Details of the notification process will be explained with reference to FIG. 16.

Figure 16:
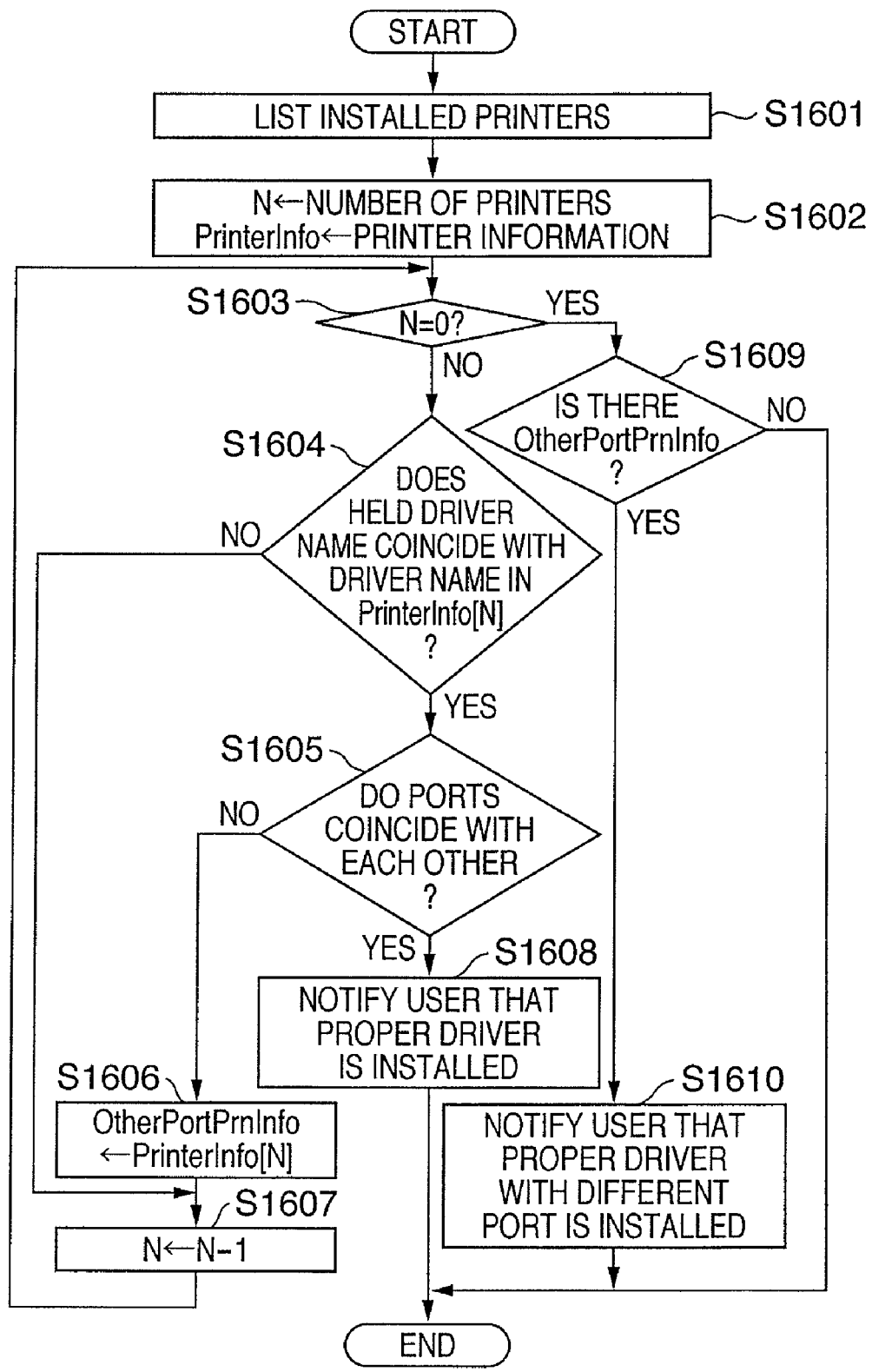
FIG. 16 is a flowchart showing details of a notification process according to the fourth embodiment of the present invention.

FIG. 16 is a flowchart showing details of the notification process according to the fourth embodiment of the present invention. The process in FIG. 16 is executed when the warning notification unit determines in FIGS. 9 and 11 to generate a warning.

The flowchart of FIG. 16 in the fourth embodiment is almost the same as that of FIG. 14 in the third embodiment, and only a difference will be explained.

In step S1605, a driver control unit 1041 determines whether ports coincide with each other (corresponding to step S1406 of FIG. 14 in the third embodiment). If the driver control unit 1041 determines that the ports do not coincide with each other (NO in step S1605), the process advances to step S1606 to set PrinterInfo[N] in OtherPortPrnInfo, and then to step S1607.

If the driver control unit 1041 determines N=0 in step S1603 (corresponding to step S1403 of FIG. 14 in the third embodiment), the process advances to step S1609 to determine whether there is OtherPortPrnInfo.

Figure 17A:
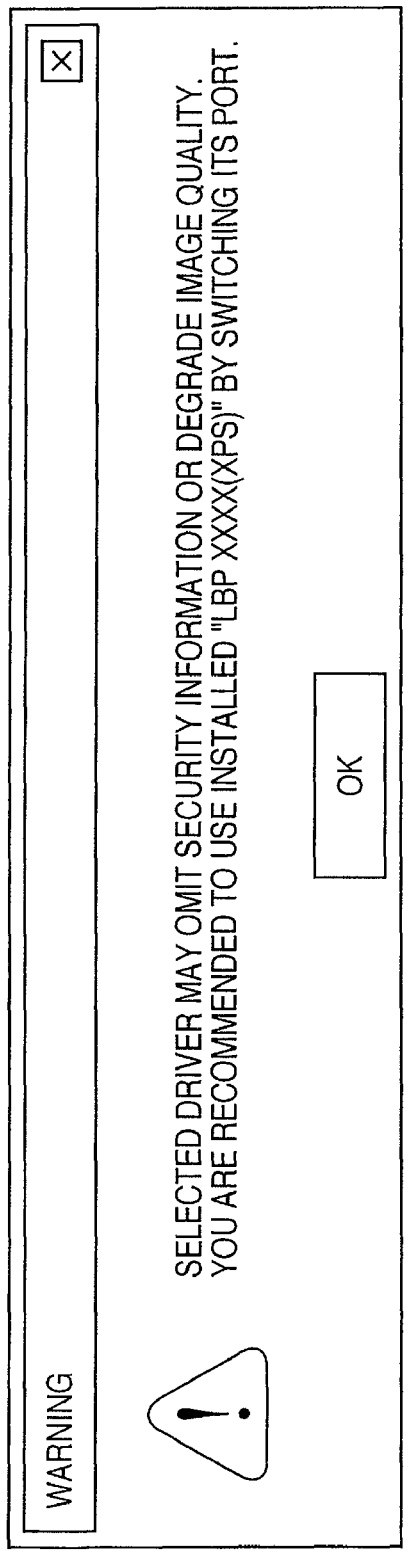
FIG. 17A is a view showing a window example of a UI which notifies the user that the port of a proper driver is different according to the fourth embodiment of the present invention.
Figure 17B:
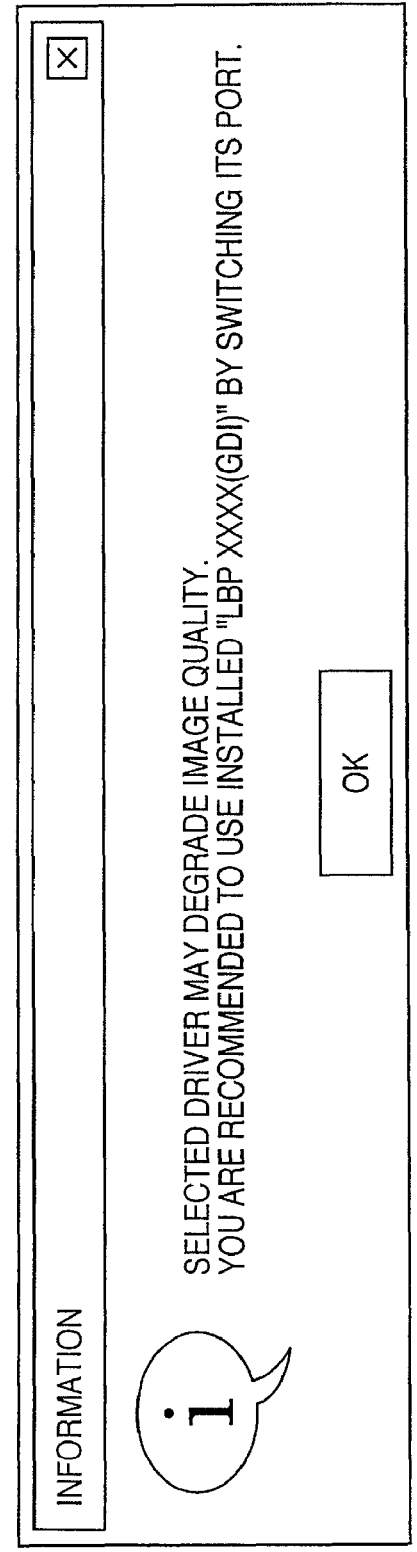
FIG. 17B is a view showing another window example of the UI which notifies the user that the port of a proper driver is different according to the fourth embodiment of the present invention.

If there is no OtherPortPrnInfo (NO in step S1609), the process ends. If there is OtherPortPrnInfo (YES in step S1609), the printer driver can determine that another printer driver is installed with a different port. In step S1610, for example, a warning notification unit 1046 of the CDI printer driver displays a message box shown in FIG. 17A. A warning notification unit 1046 of the XPS printer driver displays a message box shown in FIG. 17B.

As described above, according to the fourth embodiment, the printer driver warns that the currently selected printer driver is not proper. The printer driver recommends, as a proper printer driver, a printer driver with the same name as that of the selected printer driver. The printer driver can also recommend printing by switching the port of the proper printer driver. The printer driver can notify the user of the proper printer driver name as far as the names of printer drivers coincide with each other even if their ports do not coincide with each other.

Fifth Embodiment

In the fourth embodiment, when it is determined that a selected printer driver is not appropriate, but there is another printer driver with the same name but a different port, the user is notified of the printer driver. The fourth embodiment assumes that a printer driver compatible with one selected by the user is installed. The fifth embodiment will describe a process to notify the user of a printer driver acquisition site when no compatible printer driver is installed. In this case, the user can know the printer driver acquisition site, and easily acquire a compatible printer driver.

The printer driver holds the printer driver acquisition site in addition to the work area described in the third embodiment. The acquisition site may be a URL or path name. The acquisition site may be held by the printer driver itself, or held by the printer and acquired by the printer driver from the printer in display. The operation of the printer driver is the same as that in the first embodiment except for the notification processes in steps S609 and S809.

Details of the notification process will be explained with reference to FIG. 18.

Figure 18:
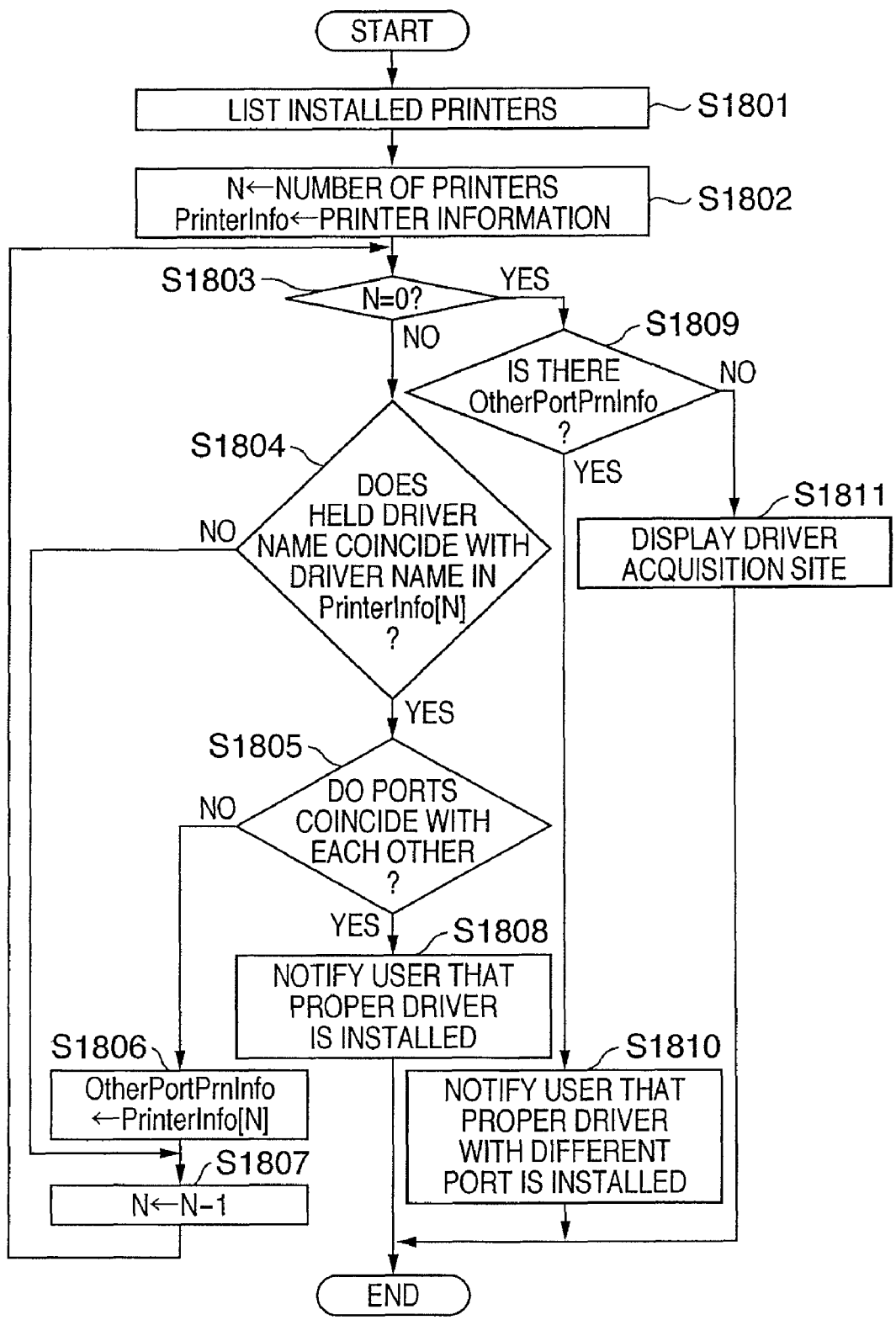
FIG. 18 is a flowchart showing details of a notification process according to the fifth embodiment of the present invention.

FIG. 18 is a flowchart showing details of the notification process according to the fifth embodiment of the present invention. The process in FIG. 18 is executed when the warning notification unit determines in FIGS. 9 and 11 to generate a warning.

The flowchart of FIG. 18 in the fifth embodiment is almost the same as that of FIG. 16 in the fourth embodiment, and only a difference will be explained.

In step S1809 (corresponding to step S1609 of FIG. 16 in the fourth embodiment), a driver control unit 1041 determines whether there is OtherPortPrnInfo. If the driver control unit 1041 determines that there is no OtherPortPrnInfo (NO in step S1809), the process advances to step S1811.

Figure 19A:
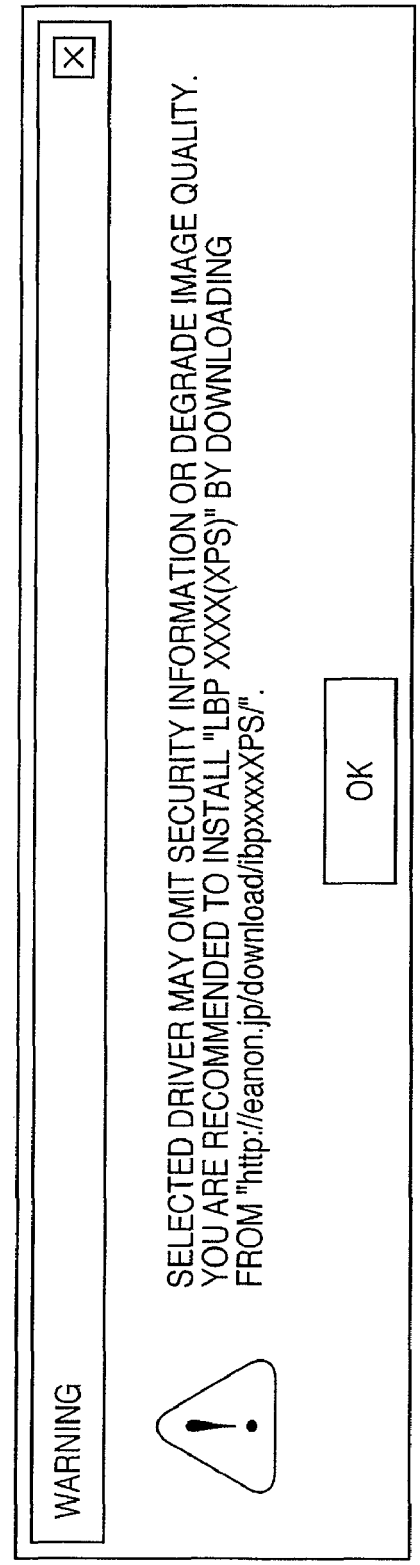
FIG. 19A is a view showing a window example of a UI which notifies the user of the acquisition site of a proper driver according to the fifth embodiment of the present invention.
Figure 19B:
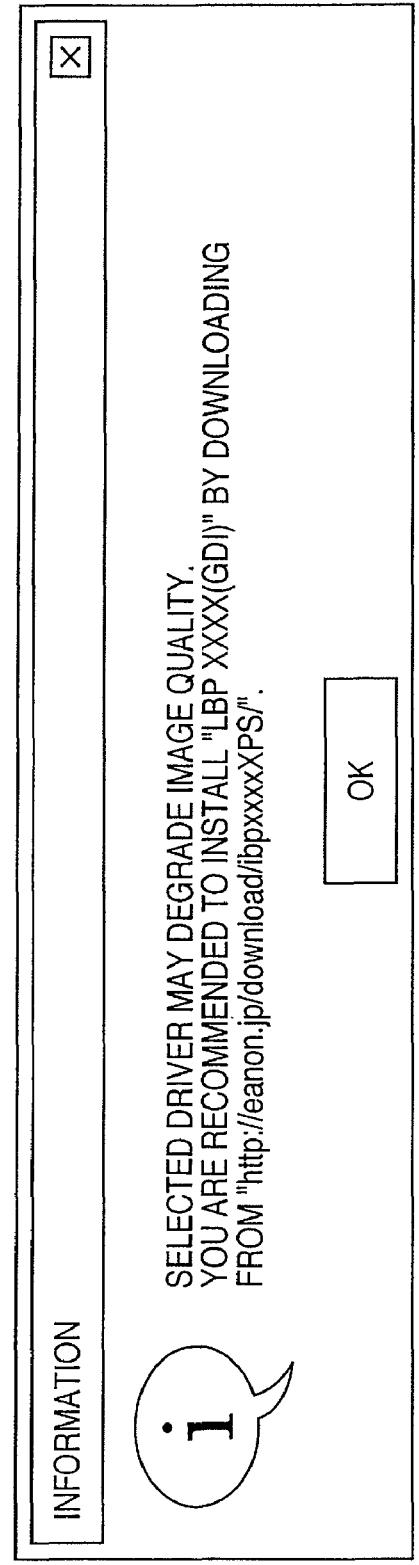
FIG. 19B is a view showing another window example of the UI which notifies the user of the acquisition site of a proper driver according to the fifth embodiment of the present invention.

In step S1811, for example, if the selected printer driver is the GDI printer driver, its warning notification unit 1046 displays a message box shown in FIG. 19A. If the selected printer driver is the XPS printer driver, its warning notification unit 1046 displays a message box shown in FIG. 19B. The printer driver holds information on the acquisition site of a proper printer driver, and if it is determined that no proper printer driver is installed, performs the process in step S1811 by reading out the acquisition site of the proper printer driver.

As described above, according to the fifth embodiment, if it is determined that a printer driver compatible with the currently selected printer driver is not installed, the printer driver can notify the user of the acquisition site URL of the printer driver to be installed. That is, when no appropriate printer driver is installed, the printer driver outputs information representing the acquisition site of an appropriate printer driver as confirmation information. The user can install the appropriate printer driver from the displayed acquisition site.

Sixth Embodiment

In the fifth embodiment, the user is notified of the printer driver acquisition site when no proper printer driver is installed, but the present invention is not limited to this. For example, a printer driver installable while displaying the UI can display a proper printer driver and prompt the user to install it. The operation of the printer driver is the same as that in the first embodiment except for the notification processes in steps S609 and S809.

Details of the notification process will be explained with reference to FIG. 20.

Figure 20:
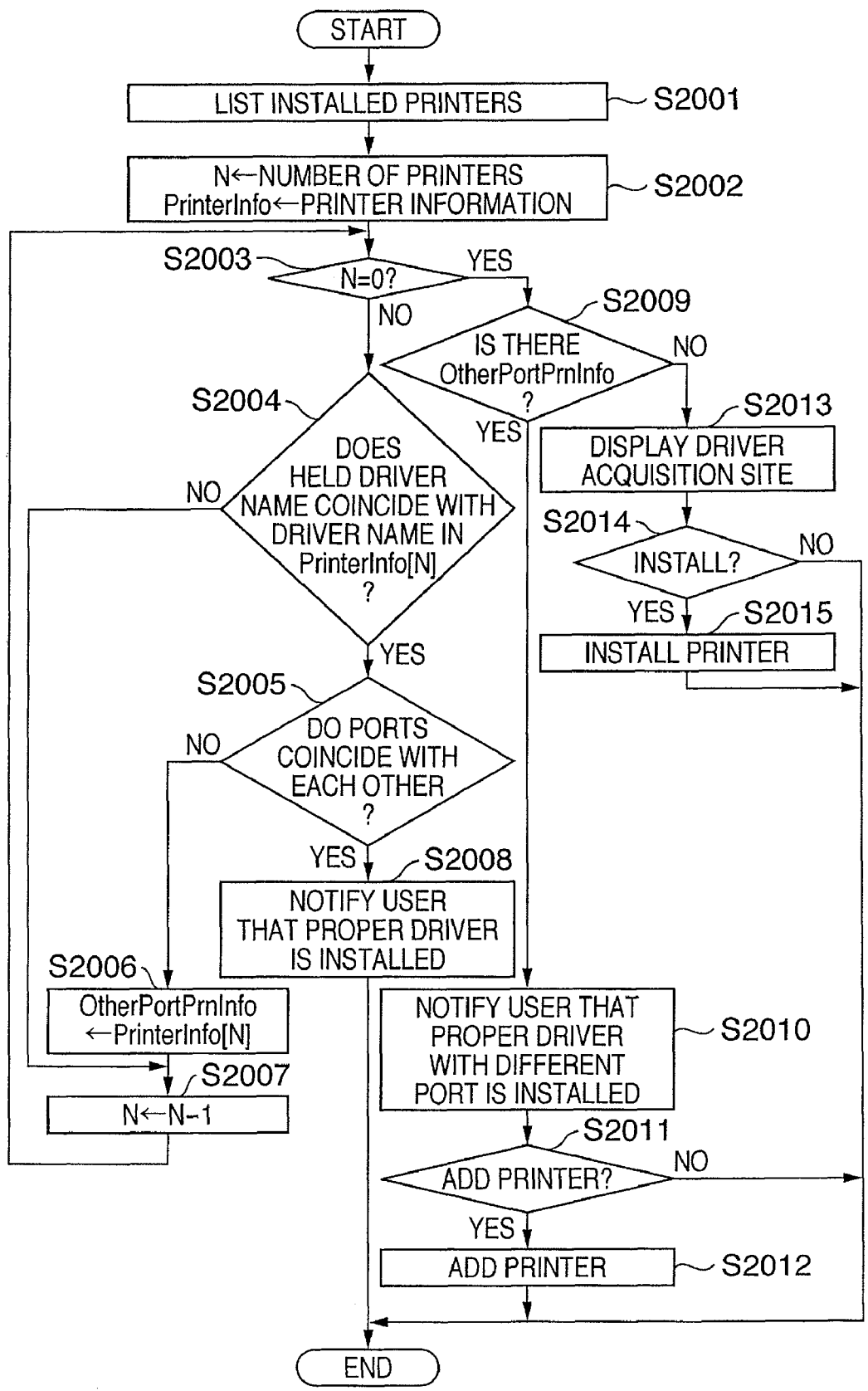
FIG. 20 is a flowchart showing details of a notification process according to the sixth embodiment of the present invention.

FIG. 20 is a flowchart showing details of the notification process according to the sixth embodiment of the present invention. The process in FIG. 20 is executed when the warning notification unit determines in FIGS. 9 and 11 to generate a warning. Similar to the fifth embodiment, the printer driver holds the printer driver acquisition site in addition to the work area described in the third embodiment.

The flowchart of FIG. 20 in the sixth embodiment is almost the same as that of FIG. 18 in the fifth embodiment, and only a difference will be explained.

Figure 21A:
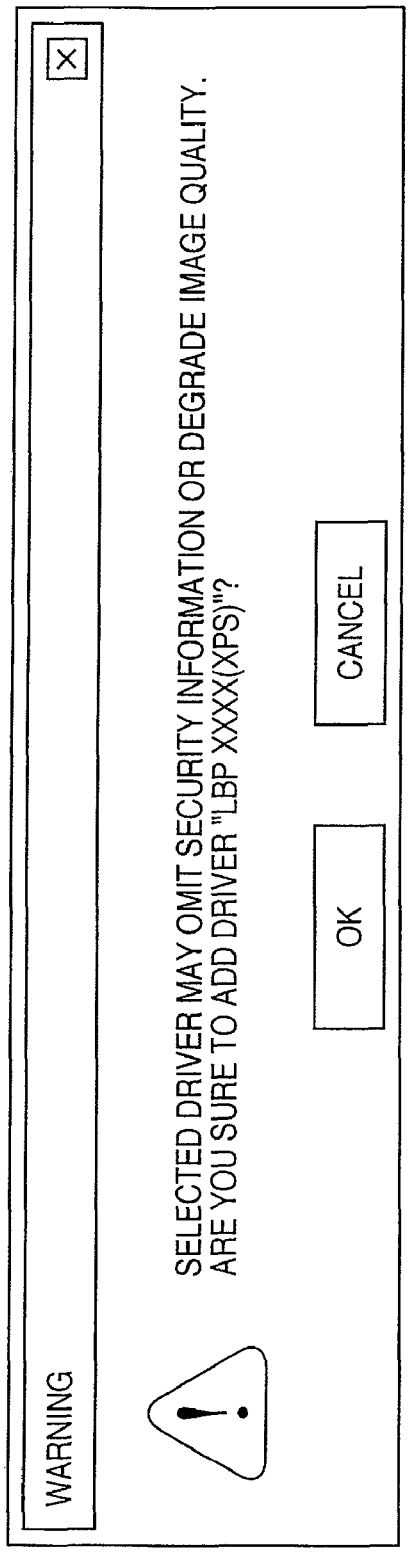
FIG. 21A is a view showing a window example of a UI which inquires whether to add a printer with a proper driver according to the sixth embodiment of the present invention.
Figure 21B:
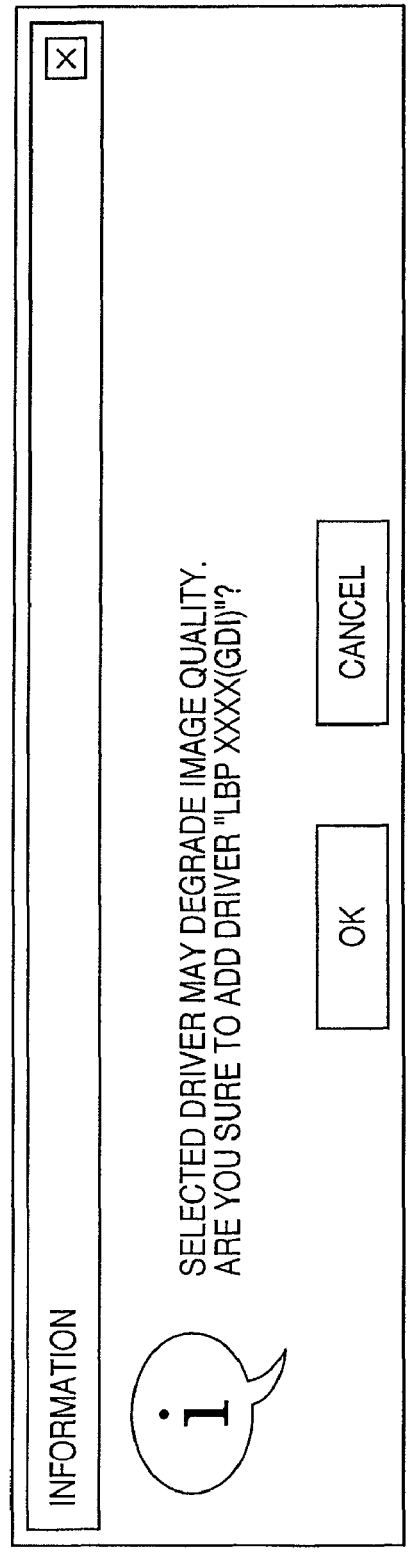
FIG. 21B is a view showing another window example of the UI which inquires whether to add a printer with a proper driver according to the sixth embodiment of the present invention.

In step S2010 (corresponding to step S1810 in the fifth embodiment), the printer driver notifies the user that another printer driver is installed with a different port. At this time, for example, if the selected printer driver is the CDI printer driver, it displays a message box shown in FIG. 21A. If the selected printer driver is the XPS printer driver, it displays a message box shown in FIG. 21B.

In step S2011, the printer driver inquires of the user whether to add a printer. In step S2011, the printer driver determines whether to add a printer by the user as a result of the inquiry through the UI in FIG. 21A or 21B. If a driver control unit 1041 recognizes that the user has selected addition of a printer (has pressed the OK button), it changes the printer driver port held in OtherPortPrnInfo.

More specifically, the driver control unit 1041 adds the printer after changing printer driver information in OtherPortPrnInfo so that the name and port of the printer driver to be added coincide with those of the currently selected printer driver. If the user has pressed the cancel button, the driver control unit 1041 determines not to add any printer.

If the driver control unit 1041 determines to add a printer (YES in step S2011), the process advances to step S2012 to add a printer, and then ends. If the driver control unit 1041 determines not to add any printer (NO in step S2011), the process ends.

Figure 22A:
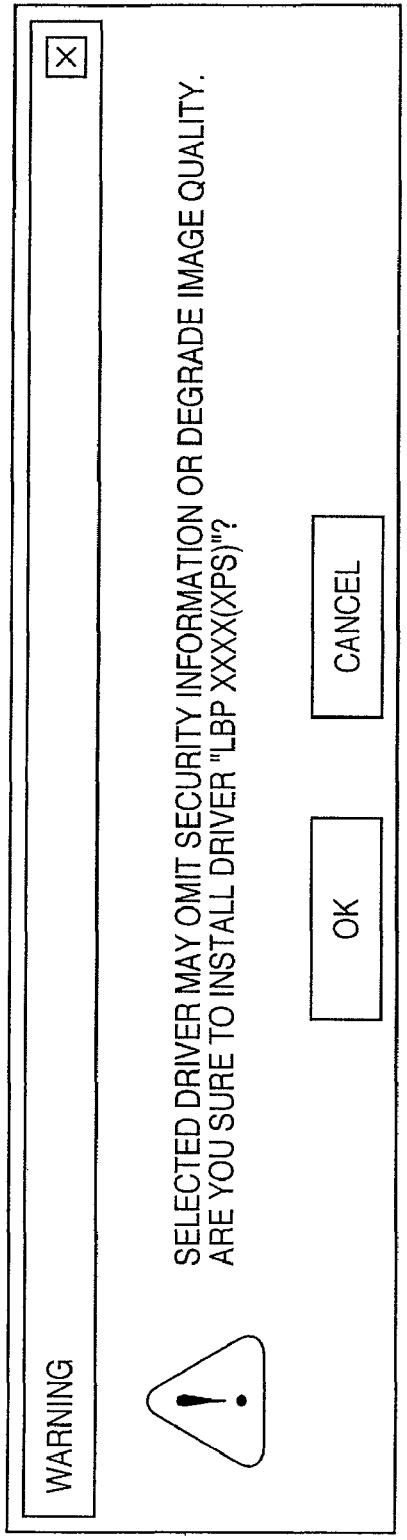
FIG. 22A is a view showing a window example of a UI which inquires whether to install a printer with a proper driver according to the sixth embodiment of the present invention.
Figure 22B:
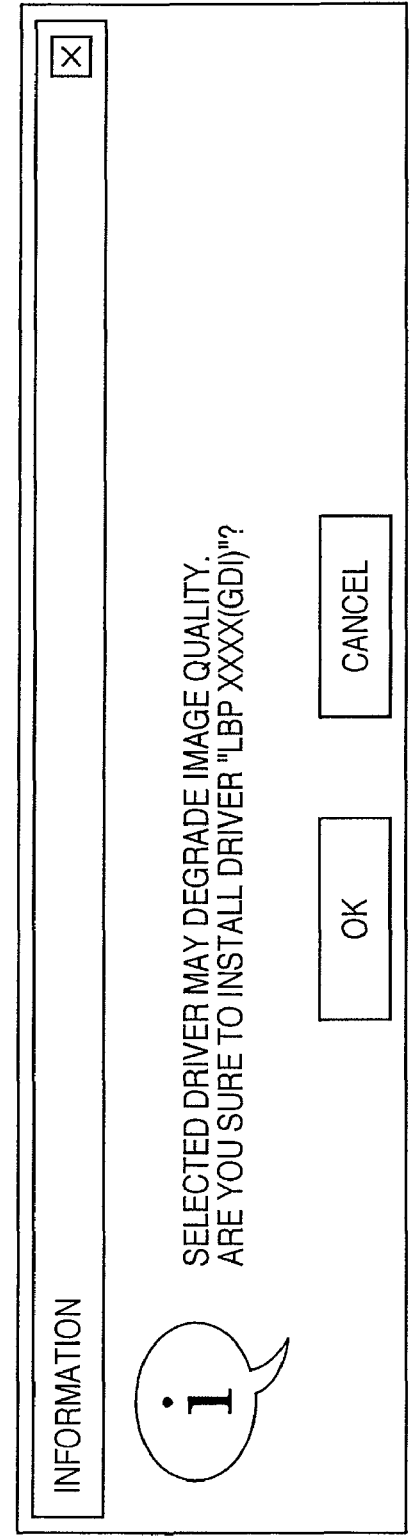
FIG. 22B is a view showing another window example of the UI which inquires whether to install a printer with a proper driver according to the sixth embodiment of the present invention.

If there is no OtherPortPrnInfo (NO in step S2009), for example, the GDI printer driver displays a message box shown in FIG. 22A in step S2013, or the XPS printer driver displays a message box shown in FIG. 22B.

In step S2014, the driver control unit 1041 determines whether to install a printer. If the driver control unit 1041 determines that the user has pressed the OK button on the message box in FIG. 22B, it installs a proper printer driver. If the user has pressed the cancel button, the driver control unit 1041 determines not to install any printer driver.

If the driver control unit 1041 determines to install a printer (YES in step S2014), the process advances to step S2015, and the driver control unit 1041 acquires acquisition site information from a driver information holding unit 1043 and installs an appropriate printer driver from the acquisition site. If the driver control unit 1041 determines not to install any printer (NO in step S2014), the process ends.

As described above, according to the sixth embodiment, when no appropriate printer driver is installed, whether to install an appropriate printer driver is confirmed as confirmation information. The user can install an appropriate printer driver without recognizing its information.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-075545 filed on Mar. 17, 2006, which is hereby incorporated by reference herein in its entirety.

What is claimed is:

1. An information processing apparatus which operates a first graphics unit that generates first graphics data processible by a first printer driver in accordance with a print instruction from a first application, and a second graphics unit that generates second graphics data processible by a second printer driver in accordance with a print instruction from a second application, comprising:

determination means for determining whether a combination of an output requesting application and a printer driver designated as an output destination is a combination of the first application and the first printer driver or a combination of the second application and the second printer driver; and output means for, when said determination means determines that the combination of the output requesting application and the printer driver is neither the combination of the first application and the first printer driver nor the combination of the second application and the second printer driver, outputting confirmation information to confirm whether to execute a print process; wherein when said determination means determines that the combination of the output requesting application and the printer driver is neither the combination of the first application and the first printer driver nor the combination of the second application and the second printer driver, said determination means determines whether a proper printer driver which corresponds to a printer driver name selected to execute a print process is installed for the same printer, and when the proper printer driver is installed for the same printer, said output means outputs information representing the installed proper printer driver as the confirmation information.

2. The apparatus according to claim 1, wherein said output means outputs, as the confirmation information, information representing that the designated printer driver is not proper.

3. The apparatus according to claim 1, wherein the first printer driver and the second printer driver have driver information of a first format, and comprise conversion means for converting the driver information of the first format into driver information of a second format.

4. The apparatus according to claim 3, wherein
when said conversion means executes conversion, said determination means of the first printer driver determines that the combination of the output requesting application and the printer driver is neither the combination of the first application and the first printer driver nor the combination of the second application and the second printer driver, and when said conversion means does not execute conversion, said determination means of the second printer driver determines that the combination of the output requesting application and the printer driver is neither the combination of the first application and the first printer driver nor the combination of the second application and the second printer driver.

5. The apparatus according to claim 1, wherein said output means outputs information representing a proper printer driver as the confirmation information.

6. The apparatus according to claim 1, wherein said determination means determines, as the proper printer driver, a printer driver having the same printer driver name as a printer driver name of a selected printer driver.

7. The apparatus according to claim 1, wherein said determination means determines, as the proper printer driver, a printer driver having the same printer driver name and the same output destination information as a printer driver name and output destination information of a selected printer driver.

8. The apparatus according to claim 1, wherein when no proper printer driver is installed, said output means outputs information representing an acquisition site of the proper printer driver as the confirmation information.

9. The apparatus according to claim 1, wherein when no proper printer driver is installed, said output means outputs, as the confirmation information, information to confirm whether to install the proper printer driver.

10. A method of controlling an information processing apparatus which operates a first graphics unit that generates first graphics data processible by a first printer driver in accordance with a print instruction from a first application, and a second graphics unit that generates second graphics data processible by a second printer driver in accordance with a print instruction from a second application, comprising:

a determination step of determining whether a combination of an output requesting application and a printer driver designated as an output destination is a combination of the first application and the first printer driver or a combination of the second application and the second printer driver; and an output step of, when the combination of the output requesting application and the printer driver is determined in the determination step to be neither the combination of the first application and the first printer driver nor the combination of the second application and the second printer driver, outputting confirmation information to confirm whether to execute a print process; wherein when the combination of the output requesting application and the printer driver is determined to be neither the combination of the first application and the first printer driver nor the combination of the second application and the second printer driver, whether a proper printer driver which corresponds to a printer driver name selected to execute a print process is installed for the same printer is determined in the determination step, and when the proper printer driver is installed for the same printer, information representing the installed proper printer driver is output as the confirmation information in the output step.

11. The method according to claim 10, wherein in the output step, information representing that the designated printer driver is not proper is output as the confirmation information.

12. The method according to claim 10, wherein the first printer driver and the second printer driver have driver information of a first format, and the method comprises a conversion step of converting the driver information of the first format into driver information of a second format.

13. The method according to claim 12, wherein
when conversion is executed in the conversion step, the combination of the output requesting application and the printer driver is determined in the determination step by the first printer driver to be neither the combination of the first application and the first printer driver nor the combination of the second application and the second printer driver, and when no conversion is executed in the conversion step, the combination of the output requesting application and the printer driver is determined in the determination step by the second printer driver to be neither the combination of the first application and the first printer driver nor the combination of the second application and the second printer driver.

14. The method according to claim 10, wherein in the output step, information representing a proper printer driver is output as the confirmation information.

15. The method according to claim 10, wherein a printer driver having the same printer driver name as a printer driver name of a selected printer driver is determined as the proper printer driver in the determination step.

16. The method according to claim 10, wherein a printer driver having the same printer driver name and the same output destination information as a printer driver name and output destination information of a selected printer driver is determined as the proper printer driver in the determination step.

17. The method according to claim 10, wherein when no proper printer driver is installed, information representing an acquisition site of the proper printer driver is output as the confirmation information in the output step.

18. The method according to claim 10, wherein when no proper printer driver is installed, information to confirm whether to install the proper printer driver is output as the confirmation information in the output step.

19. A computer program which is stored in a computer-readable medium and causes a computer to control an information processing apparatus which operates a first graphics unit that generates first graphics data processible by a first printer driver in accordance with a print instruction from a first application, and a second graphics unit that generates second graphics data processible by a second printer driver in accordance with a print instruction from a second application, causing the computer to execute
- a determination step of determining whether a combination of an output requesting application and a printer driver designated as an output destination is a combination of the first application and the first printer driver or a combination of the second application and the second printer driver, and
- an output step of, when the combination of the output requesting application and the printer driver is determined in the determination step to be neither the combination of the first application and the first printer driver nor the combination of the second application and the second printer driver, outputting confirmation information to confirm whether to execute a print process; wherein
- when the combination of the output requesting application and the printer driver is determined to be neither the combination of the first application and the first printer driver nor the combination of the second application and the second printer driver, whether a proper printer driver which corresponds to a printer driver name selected to execute a print process is installed for the same printer is determined in the determination step, and
- when the proper printer driver is installed for the same printer, information representing the installed proper printer driver is output as the confirmation information in the output step.

20. The program according to claim 19, wherein in the output step, information representing that the designated printer driver is not proper is output as the confirmation information.

21. The program according to claim 19, wherein the first printer driver and the second printer driver have driver information of a first format, and the program comprises a conversion step of converting the driver information of the first format into driver information of a second format.

22. The program according to claim 21, wherein
- when conversion is executed in the conversion step, the combination of the output requesting application and the printer driver is determined in the determination step by the first printer driver to be neither the combination of the first application and the first printer driver nor the combination of the second application and the second printer driver, and
- when no conversion is executed in the conversion step, the combination of the output requesting application and the printer driver is determined in the determination step by the second printer driver to be neither the combination of the first application and the first printer driver nor the combination of the second application and the second printer driver.

23. The program according to claim 19, wherein in the output step, information representing a proper printer driver is output as the confirmation information.

24. The program according to claim 19, wherein a printer driver having the same printer driver name as a printer driver name of a selected printer driver is determined as the proper printer driver in the determination step.

25. The program according to claim 19, wherein a printer driver having the same printer driver name and the same output destination information as a printer driver name and output destination information of a selected printer driver is determined as the proper printer driver in the determination step.

26. The program according to claim 19, wherein when no proper printer driver is installed, information representing an acquisition site of the proper printer driver is output as the confirmation information in the output step.

27. The program according to claim 19 wherein when no proper printer driver is installed, information to confirm whether to install the proper printer driver is output as the confirmation information in the output step.

* * * * *